United States Patent [19]

Kurahayashi et al.

[11] Patent Number: 4,772,955
[45] Date of Patent: Sep. 20, 1988

[54] DATA COMMUNICATION APPARATUS

[75] Inventors: Sadasuke Kurahayashi, Niiza; Masahiro Sakamoto, Tokyo; Masatomo Takahashi, Tokyo; Motoaki Yoshino, Tokyo; Yasuhide Ueno, Tokyo; Tsunehiro Watanabe, Tokyo; Tsuneo Negi; Takeshi Ono, Both of Yokohama; Shigeo Miura, Tokyo, all of Japan

[73] Assignee: Canon Kabushiki Kaisha, Tokyo, Japan

[21] Appl. No.: 823,118

[22] Filed: Jan. 27, 1986

[30] Foreign Application Priority Data

| Jan. 31, 1985 | [JP] | Japan | 60-17016 |
| Jan. 31, 1985 | [JP] | Japan | 60-17021 |
| Jan. 31, 1985 | [JP] | Japan | 60-17022 |
| Jan. 31, 1985 | [JP] | Japan | 60-17023 |
| Jan. 31, 1985 | [JP] | Japan | 60-17026 |
| Jan. 31, 1985 | [JP] | Japan | 60-17028 |

[51] Int. Cl.⁴ .................................... H04M 1/32
[52] U.S. Cl. .................................... 358/257; 358/260; 358/263; 358/290

[58] Field of Search ............... 358/257, 260, 261, 263, 358/290

[56] References Cited

U.S. PATENT DOCUMENTS

| 4,419,697 | 12/1983 | Wada | 358/257 |
| 4,432,020 | 2/1984 | O'Mose et al. | 358/257 |
| 4,441,208 | 4/1984 | Iida | 358/261 |
| 4,581,656 | 4/1986 | Wada | 358/261 |

FOREIGN PATENT DOCUMENTS 2117602A 10/1983 United Kingdom .

Primary Examiner—Edward L. Coles, Sr.
Attorney, Agent, or Firm—Fitzpatrick, Cella, Harper & Scinto

[57] ABSTRACT

A data transmission apparatus includes; comprising: a transmission data generating unit, a storage unit for storing the transmission data; and a unit for transmitting the transmission data in the storage unit; wherein the storage unit stores, together with the transmission data, time and date when the transmission data was stored.

19 Claims, 28 Drawing Sheets

FIG. 2B
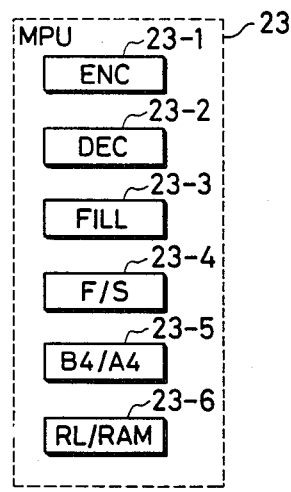
FIG. 3A
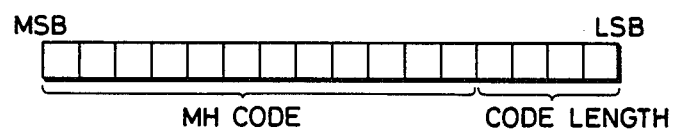
MSB — MH CODE — CODE LENGTH — LSB
FIG. 4
FIG. 5

FIG. 7

| ADDRESS OF POINTER (HEXADECIMAL) | | DATA (HEXADECIMAL) | MH CODE (BINARY) | RUN-LENGTH (DECIMAL) |
|---|---|---|---|---|
| FIRST BIT 0 | 4000 | 4008 | | |
| | 4002 | 4004 | | |
| | 4004 | 8H03 | B1 | 3 |
| | 4006 | 8H02 | B11 | 2 |
| SECOND BIT 0 | 4008 | 4010 | | |
| | 400A | 400C | | |
| | 400C | 8H01 | B010 | 1 |
| | 400E | 8H04 | B011 | 4 |
| THIRD BIT 0 | 4010 | 4018 | | |
| | 4012 | 4014 | | |
| | 4014 | 8H06 | B0010 | 6 |
| | 4016 | 8H05 | B0011 | 5 |
| FORTH BIT 0 | 4018 | 4024 | | |
| | 401A | 401C | | |
| | 401C | 4020 | | |
| | 401E | 8H07 | B00011 | 7 |
| | 4020 | 8H09 | B000100 | 9 |
| | 4022 | 8H08 | B000101 | 8 |
| FIFTH BIT 1 | 4024 | 407C | | |
| | 4026 | 4028 | | |
| SIXTH BIT 1 | 4028 | 4078 | | |
| | 402A | 402C | | |
| SEVENTH BIT 1 | 402C | 4030 | | |
| | 402E | 8H0C | B0000111 | 12 |
| | 4030 | 405C | | |
| | 4032 | 4034 | | |

FIG. 8A

| ADDRESS POINTER (HEXADECIMAL) | | DATA (HEXADECIMAL) | |
|---|---|---|---|
| FIRST BIT 0 | 3000 | 3004 | |
| | 3002 | 8H | (ADDRESS OF SUBROUTINE V(0)) |
| | 3004 | 300C | |
| SECOND BIT 0 | 3006 | 3008 | |
| | 3008 | 8H | (ADDRESS OF SUBROUTINE $V_L(1)$) |
| | 300A | 8H | (ADDRESS OF SUBROUTINE $V_R(1)$) |
| | 300C | 3010 | |
| THIRD BIT 0 | 300E | 8H | (ADDRESS OF SUBROUTINE H) |
| | 3010 | 3014 | |
| FORTH BIT 0 | 3012 | 8H | (ADDRESS OF SUBROUTINE P) |
| FIFTH BIT 1 | 3014 | 301C | |
| | 3016 | 3018 | |
| SIXTH BIT 1 | 3018 | 8H | (ADDRESS OF SUBROUTINE $V_L(2)$) |
| | 301A | 8H | (ADDRESS OF SUBROUTINE $V_R(2)$) |
| | 301C | 3026 | |
| | 301E | 3020 | |
| | 3020 | 8H | (ADDRESS OF SUBROUTINE $V_L(3)$) |
| | 3022 | 8H | (ADDRESS OF SUBROUTINE $V_R(3)$) |
| | 3024 | 3028 | |
| | ------ | ------ | |

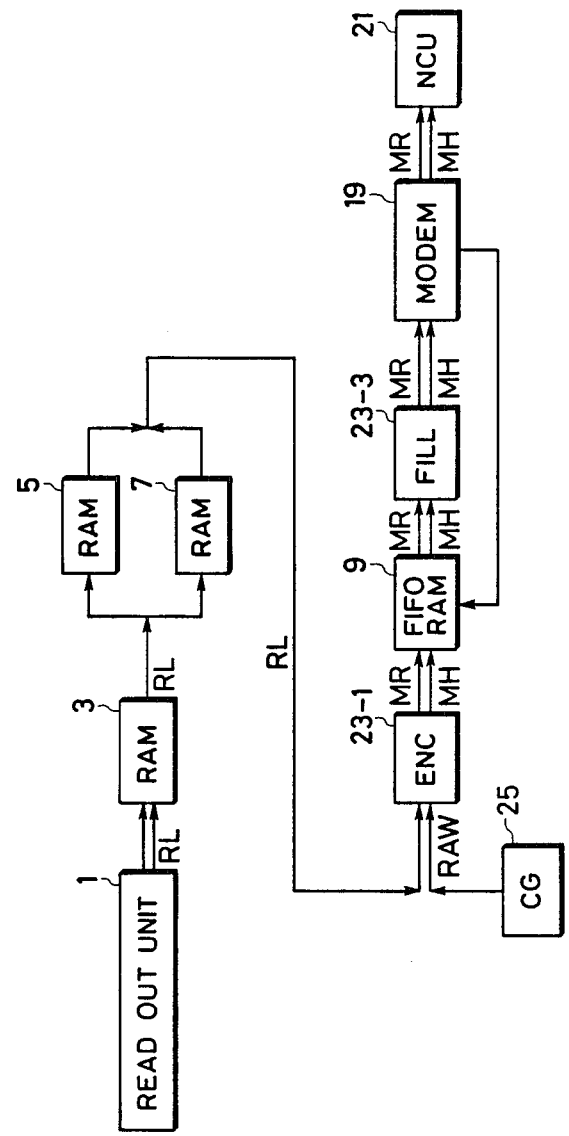

DATA COMMUNICATION APPARATUS

BACKGROUND OF THE INVENTION

1. Field of the Invention

The present invention relates to a communication apparatus for transmitting and/or receiving data such as an image, e.g., compressed encoded image and character code.

2. Description of the Prior Art

Of the image communication apparatus of this type, there is known a facsimile apparatus provided with an image memory.

In case that the same image data is to be sent to various destinations, or no connection is attained even if transmission to a certain destination is desired, use of the image memory is very advantageous since the image of an original can be stored in the image memory.

However, only the image signal of an original is stored in the image memory so that the user cannot judge if he is allowed to erase data in the image memory.

Conventionally, only an image having a certain size or image data suitable for a certain transmission mode has been allowed to be stored in the image memory. Therefore, sometimes it becomes impossible to transmit the image signal stored in the memory because of the reception mode of a partner machine. Thus, it becomes necessary to convert the amount of image data, such as a scan line density or the number of dots in one scan line.

In this case, particularly in case of reducing the amount of data, character information regarding a sender and transmission time to be recorded in a relatively small space is also reduced in size, thus making it not legible at the partner device.

Furthermore, image data once stored in the image memory cannot be erased unless the operator works to such effect, thereby resulting in ineffective usage of the image memory and complicated operation.

Some apparatus have been proposed wherein image data is automatically erased after a lapse of a certain time. With such apparatus, however, unnecessary erasure of image data may happen in case of a time designated transmission mode. Thus, it is very inconvenient.

Conventionally, a buffer memory for temporarily storing encoded image data during transmission has been provided together with the image memory. However, in case that the buffer memory of a large capacity is used as the image memory, there is no space for temporarily storing encoded image data during an original transmission if image data is already stored in the buffer memory.

While storing image data in the image memory, EOL code indicative of the end of one line of image data is also stored. EOL code together with image data is transmitted to detect the end of one line at the receiving side.

EOL code to be used in transmission conforms with Recommendation of CCITT. However, some EOL code has the same bit length as that of MH code indicating the line length. Thus, it is difficult to search EOL code in a short time.

As above, use of the image memory has been associated with various problems.

SUMMARY OF THE INVENTION

It is an object of the present invention to provide a data or image communication apparatus eliminating the above problems.

It is another object of the present invention to provide a data communication apparatus capable of identifying date and time when data was stored in storage means.

It is a further object of the present invention to provide an image transmission apparatus capable of transmitting to any desired partner by storing information regarding an image or image signal stored in storage means which stores an image signal.

It is a still further object of the present invention to provide a data transmission apparatus wherein effective use of storage means for storing data can be attained and the operator can readily operate. More particularly, it is an object of the present invention to provide a transmission apparatus capable of automatically erasing only those data already transmitted.

It is another object of the present invention to provide an image transmission apparatus capable of converting the amount of image data. More particularly, it is an object of the present invention to provide an image transmission apparatus capable of discriminating a sender and transmission time even in the case of converting the amount of image data.

It is a further object of the present invention to provide an image transmission apparatus capable of transmitting an original image even when data is being stored in storage means for storing encoded image data.

It is an object of the present invention to provide an image transmission apparatus capable of readily detecting EOL code indicating the end of one line of image data stored in storage means.

BRIEF DESCRIPTION OF THE DRAWINGS

The above and other objects of the present invention will become apparent from the following detailed description with reference to the accompanying drawings, in which:

FIG. 2B shows a fundamental function of MPU 23 shown in FIG. 2A;

FIG. 3A shows a format of MH code in ROM 11 shown in FIG. 2A;

FIGS. 4 and 5 show formats of EOL in RAM 9;

FIG. 7 shows a search example in converting MH code into RL code;

FIG. 8A shows a search example in converting MR code into RL code;

FIG. 12A is a block diagram showing a flow of image data in mode M2;

DESCRIPTION OF THE PREFERRED EMBODIMENTS

An example of a facsimile apparatus embodying the present invention will now be described.

(Mechanical Construction)

Figure 1:
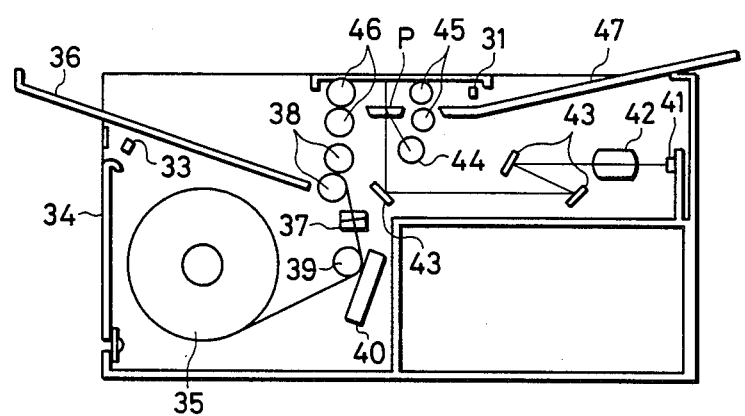
FIG. 1 is a sectional view of a facsimile apparatus showing an embodiment of the present invention.

Referring now to FIG. 1 showing a sectional view of the facsimile apparatus, reference numeral 41 denotes a CCD solid line image sensor, numeral 42 stands for a focussing lens, 43 for mirrors, 44 for an original illuminating lamp, 45 for original feed rollers, 46 for original pickup rollers, and 47 for an original feed tray. Reference numeral 31 denotes an original detection sensor for detecting if an original is present on the original feed tray.

Reference numeral 34 denotes a roll paper housing cover, numeral 35 stands for roll paper, 36 for a pickup tray for an original and record paper, 37 for a cutter, 38 for roll paper pickup rollers, 39 for roll paper transportation rollers, 40 for a recording head, and 33 for a roll paper cover sensor for detecting the open/close state of the cover 34.

In reading an original and referring to FIG. 1, an original on the original feed tray is transported by means of the rollers 45 and 46. The original is applied with light from the lamp 44 at a read-out position P. The reflected light therefrom is focussed onto the image sensor 41 via the mirrors 43 and the lens 42. The image sensor 41 converts the image into electrical signals.

Conversely in recording, a roll paper 35 is transported while squeezed between the roller 39 and the head 40 whereat the thermal roll paper 35 is formed with the image by means of the head 40. After recording one page, the roll paper 35 is cut with the cutter 37 and transported and picked up on the pickup tray 36 by means of the rollers 38.

(Basic Block Diagram)

Figure 2A:
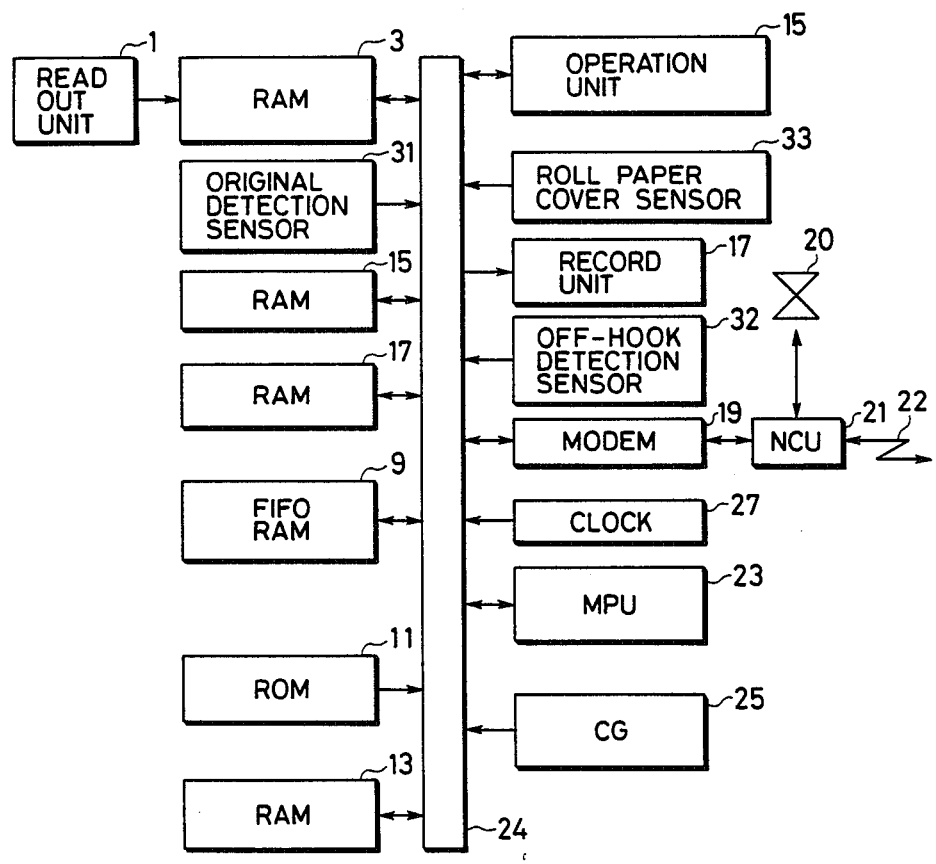
FIG. 2A is a fundamental block diagram for control of the facsimile apparatus of the embodiment.

FIG. 2A is a basic block diagram for control of the facsimile apparatus of the present embodiment. In the figure, a read-out unit 1 reads out an original image and converts it into electrical image signals. Random access memories 3, 5 and 7 (hereinafter abbreviated as RAM) function to temporarily store such as image signals. A first-in and first-out RAM 9 (hereinafter abbreviated as FIFO RAM) functions to serve as an image memory for storing image signals of several pages. A read-only memory 11 (hereinafter as ROM) stores operation programs of MPU 23. RAM 13 stores flags, data and so on necessary for operation of MPU 23. An operation unit 15 includes input keys, displays and so on. A record unit 17 records on a thermal paper a copy image, received image and management data. A modem 19 modulates transmitting data and demodulates received data. A network control unit 21 (hereinafter as NCU) controls to connect a communication line 22 either to the modem 19 or to a telephone 20. A character generator 25 (hereinafter as CG) is used for transmitting, together with image data of an original, the sender and transmission time and for storing character fonts for recording communication management data. MPU 23 controls the whole system of the apparatus. In this embodiment, a microprocessor 8086 manufactured by Intel Corp. is used which can make direct access to a 16 bit data bus 24 and a memory space up to the maximum 4 Mega bytes.

The merit in using this type of MPU is an easy handling of encoded image data due to the presence of a 16 bit data bus. For instance, if 2048 bit data is to be processed by a run-length (hereinafter abbreviated as RL) code, 12 bit data is required. In this case, although two accesses are needed using 8 bit MPU, only one access suffices using 16 bit MPU.

Furthermore, since a memory space of a large capacity can directly be accessed, it is possible to provide a broadcast function by using the system memory as an image memory. In a conventional system, the broadcast function of an image memory has been achieved by using an external memory or an internal memory not directly accessible by MPU via a bus, thus resulting in a problem of complicated circuitries and bulky apparatus.

(Function of MPU)

MPU 23 has six fundamental functions shown in FIG. 2B. Each of the functions will now be explained hereinbelow.

Encoding Function (Conversion of RL into MH, MR, and other codes)

(a) Conversion of RL into MH code

In encoding, first, a one line read-out instruction is fed to the read-out unit 1. Then, the read-out unit 1 converts the read-out one line image data into RL code to write it in RAM 3. MPU 23 reads RL code out of RAM 3 to look up a code conversion table in ROM 11 using the read-out RL code and convert it into MH code. The conversion table is mapped into ROM 11 wherein MH code data corresponding to the runlength is written at the address identified by RL code. The format of MH code data is shown in FIG. 3.

In FIG. 3A, MH code is located at the upper 12 bits from MSB. Sine MH code is a variable length code, code length information of MH code is located at the lower 4 bits to identify the code length. The MH code conversion table includes 13 bit code at the maximum although MH code is allocated at the upper 12 bits. In this respect, it is to be noted that all of the codes having a 13 bit code length are appended with "0" at the head (MSB) thereof. 12 bits except the head bit "0" in the conversion table data are used as MH code, and information on the data length "13" is added thereto. In particular, by looking up the conversion table, if the data length is "13", then MPU 23 adds "0" to the head of the code.

As all MH codes and their code lengths are properly allocated in 16 bit length, an easy processing by 16 bit MPU and a high speed access to MH code are possible.

(b) Conversion of RL into MR code

Conversion into MR code is effected by MPU 23 with reference to a basic flow described in T4 Recommendation of CCITT. In this basic flow, the most frequently used and important item is "detection of inversion of pixel black/white". To facilitate such detection, the read-out unit 1 encodes data to be written in RAM 3 into RL code.

Figure 3B:
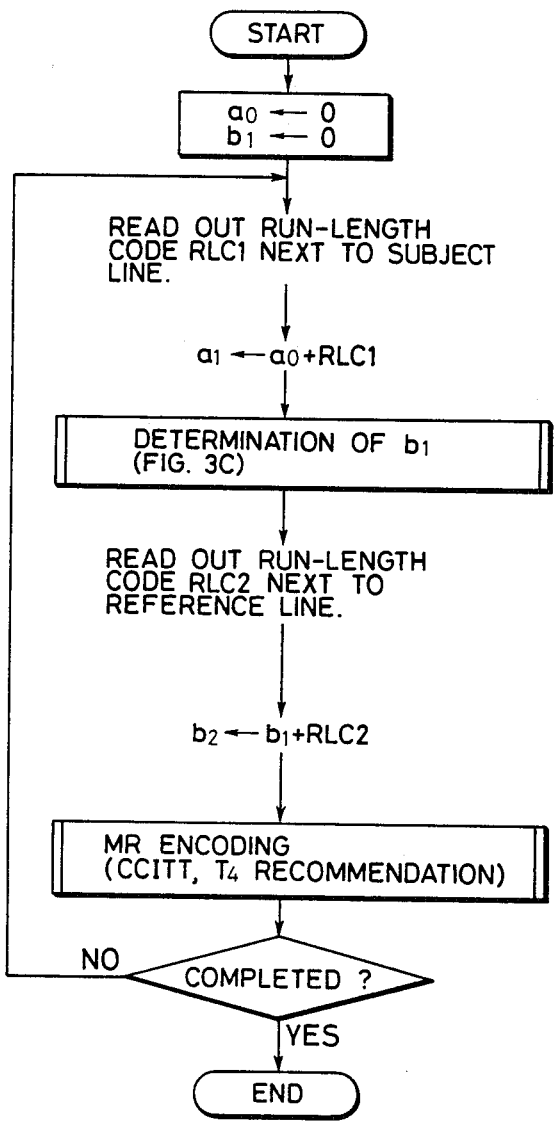
FIGS. 3B and 3C are flow charts for converting RL code into MR code.
Figure 3C:
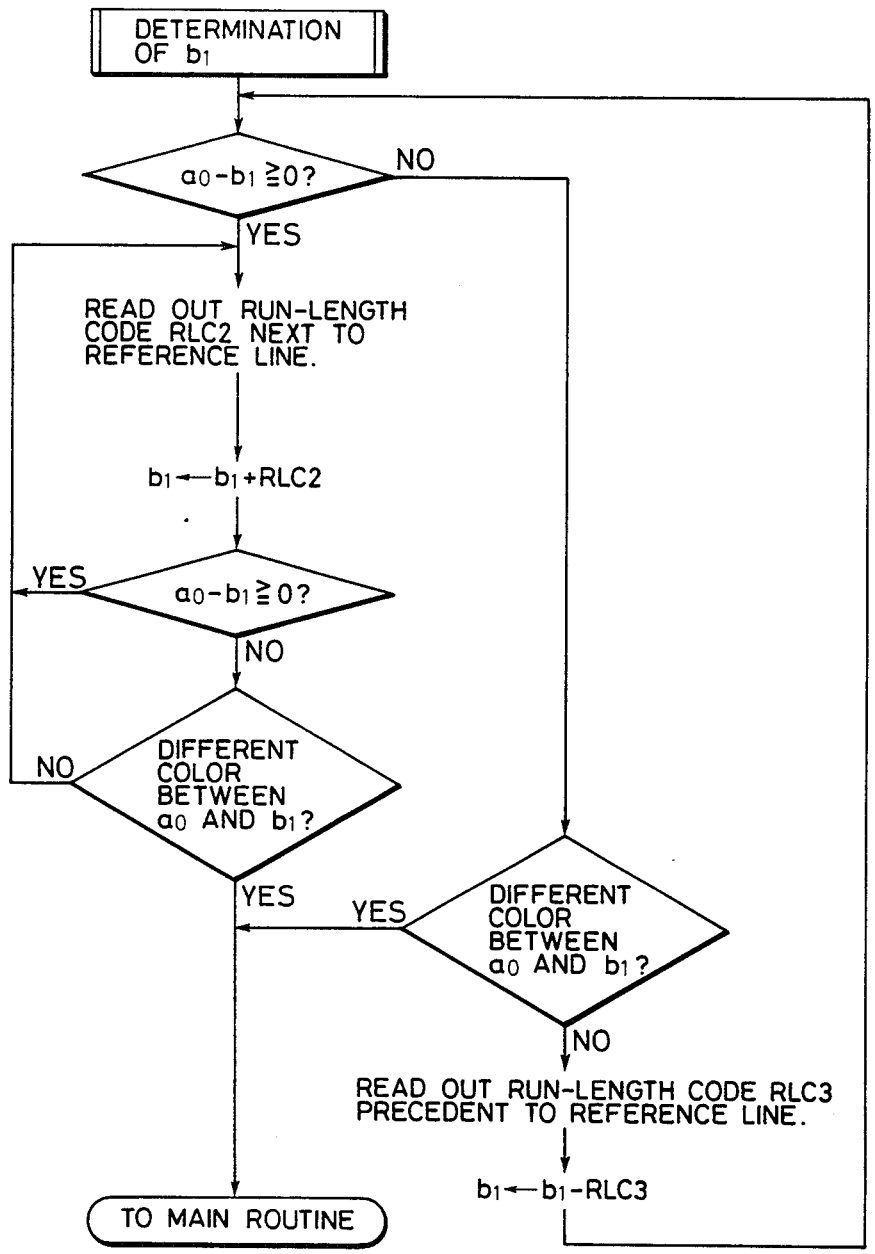

A program flow for converting RL code into MR code is shown in FIG. 3B, and a subroutine for deciding parameter $b_1$ is shown in FIG. 3C.

Referring to FIG. 3B, first parameters $a_0$ and $b_1$ are initialized to zero. Parameter $a_1$ is determined by reading out RL code next to an object line. After parameter $b_1$ is determined via the subroutine of FIG. 3B, parameter $b_2$ is determined by reading out RL code next to a reference line. In the MR encoding routine in conformity with T4 Recommendation, MR code is identified and simultaneously therewith the value next to parameter $a_0$ is decided.

In the subroutine shown in FIG. 3C, parameter $b_1$ is determined according to the definition of Recommendation that parameter $b_1$ is obtained when a first different color (white/black) from that of parameter $b_0$ appears on the right side of parameter $a_0$.

Conversion of RL code into MR code can be performed easily as compared with conversion of raw image data into MR code.

(c) Conversion of CG code into MH code

This apparatus has a function to transmit as image data information on such a characters other than image data read out by the read-out unit 1. To achieve such function, first, using CG code, raw data corresponding to CG code is fetched from CG 25. Raw data is converted into RL code and further into MH code for transmission. The output of this conversion table is not RL code but raw data. The reason to this is that if the conversion table is constructed of RL codes, the number of codes becomes large to accordingly necessitate a large CG table in capacity, and that the capacity of CG 25 is intended to be reduced by using raw data. Furthermore, by using raw data, it is advantageous in that decoding is unnecessary in case of transfer in a non-compression mode such as G2 Mode.

(d) Handling of EOL

In transmission/reception in G3 Mode, image data is handled in line synchro. As a line synchro signal, EOL (End Of Line) is used. EOL is constructed of consecutive 11 "0s" and a single "1" (in case of MR code, "1" or "0" is additionally appended).

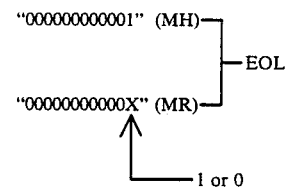

Each time MPU 23 detects one line end, it adds EOL to image data and transmit them together. In adding EOL, calculation of a transfer time on a transmission line is carried out. If the transfer time is shorter than the minimum transfer time, Fill bits are inserted before addition of EOL so as to make the transfer time equal the minimum transfer time. In practical transmission, MH code is temporarily stored in FIFO RAM 9, and MPU 23 reads out MH code from RAM 9 to transmit it. Calculation of the minimum transfer time and insertion of Fill bits are executed for transmission by reading MH code from RAM 9 under control of MPU 23. Therefore, how EOL is detected during reading RAM 9 becomes important. In the present apparatus, the following methods are employed for simplifying EOL detection during reading RAM 9 and EOL delivery.

Three basic concepts for handling EOL are:

(1) Addition of EOL is effected at the time of writing into RAM 9.

(2) Detection of EOL during reading RAM 9 is achieved by way of 2 byte consecutive 0s.

(3) During delivery of data in RAM 9, the second byte 0s among 2 byte consecutive 0s are not delivered. The description will proceed taking the following two exemplary cases in consideration.

The arrangement of data and EOL stored in RAM 9 is shown in FIG. 4 wherein data "1" in one line is present in the last byte. In the figure, image data of the last byte A is represented by DT. 0s are filled in after data DT in the byte A. Bytes B and C are all filled in with 0s, and 1X is inserted in D byte. The number of 0s to be inserted before 1X in D byte is decided as in the following Table, depending on the number of 0s inserted in A byte.

| Number of 0s inserted in A byte | 0 | 1 | 2 | more than 3 |
|---|---|---|---|---|
| Number of 0s added before 1X in D byte | 3 | 2 | 1 | 0 |
| Number of 0s when B or C byte is deleted | 11 | 11 | 11 | more than 11 |

As seen from the foregoing, 11 0s can be guaranteed even one byte 0s of EOL in RAM 9 is deleted during delivery of EOL.

Next, the arrangement of image data and EOL stored in RAM 9 is shown in FIG. 5 wherein data "1" in one line is not present in the last byte. As shown in the figure, if data DT included in the last byte A are all 0s, the remainder of byte A is filled in with 0s. Byte B is also filled in with 0s. In byte C, after 0s corresponding in number to a subtraction result of 11 by the number n of 0s inserted in byte A by 1, 1X are inserted.

| Number of 0s inserted in A byte | 7 | 6 | 5 |
|---|---|---|---|
| Number of 0s to be inserted in C byte | 4 | 5 | 6 |

Since MH code has no more than the last 4 consecutive 0s, MH code with less than 4 0s inserted in A byte is not taken into consideration.

In case of a white line skip transfer, as a discrimination criteria for all white, the second byte "0s" are set as "01" (hexadecimal) for all white data in one line.

FIFO RAM 9 is written in the above-noted format. Therefore, in reading RAM 9, EOL detection is readily achieved by way of 2 byte consecutive 0s or one byte 0s and "01" (hexadecimal). Furthermore, during delivery of read-out data, EOL delivery is readily performed by deleting the second byte 0s (or "01"). Although EOL delivery is possible without deletion of the second byte 0s, deletion avoids delivery of unnecessary data to thereby result in a short transfer time.

Decoding Function (conversion of MH, MR codes into RL code)

(a) Conversion of MH code into RL code

Decoding is conducted through the MH to RL conversion table based on MH code fetched from FIFO RAM 9. In this case, the way to look up the table is different from that with the previously described RL to MH conversion table.

Figure 6:
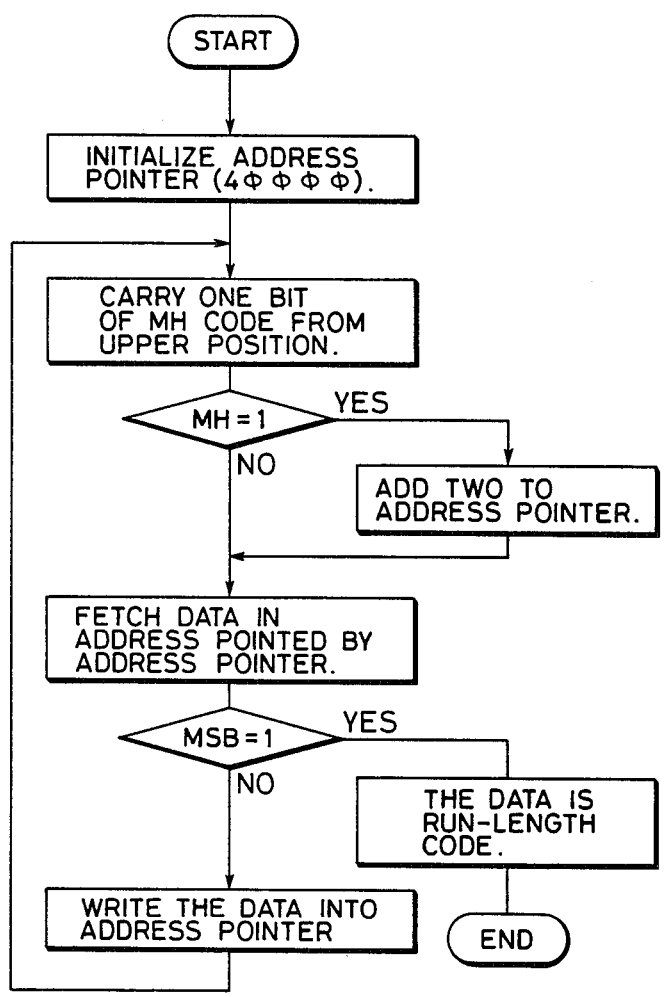
FIG. 6 is a flow chart for converting MH code into RL code.

FIG. 6 shows a conversion flow from MH code to RL code, and FIG. 7 is the MH to RL conversion table. As apparent from the flow shown in FIG. 6, MH code is searched one bit after another. In case of "0", data at the address identified by the current address pointer is looked up, while in case of "1", data at the next address identified by the current pointer is looked up. If MSB indicates "1", the data is the run-length. If "0", the data is written into the address pointer for use in the next search. In particular, until data (starting from 8 in decimal) having "1" at MSB is found, MH code is searched one bit after another. In FIG. 7, a search example of MH code of black "0000111" is shown. It is understood that MH code in this case corresponds to RL code of "black 12".

The conversion table differs for respectively black and white codes since some MH codes are the same for different black and white run-lengths.

(b) Conversion of MR code into RL code

This conversion is conducted using the conversion table, similarly to that with MH to RL conversion. However, in this case, data obtained at MSB=1 is not RL code but the content of a jump address of the program. Starting from the jump address, processings necessary for MR code are executed to generate RL code.

MR decoding employs two-dimensional compression, so that RL code corresponding only to single, independent MR code is not present. It is necessary to generate RL code by using MR code basing on data of the preceding line. Therefore, jump addresses of the program are written in the conversion table. A search example of MR code "000011" is illustrated in FIG. 8A.

(Calculation of minimum transfer time and Insertion and Deletion of Fill bits)

During G3 transmission, one line data added with EOL thereafter is being delivered. The transfer time for delivered one line data is calculated. If the calculated transfer time is shorter than the minimum transfer time, Fill bits (0s) are inserted before addition of EOL to make the transfer time equal or longer than the minimum transfer time.

In the present apparatus, a judge whether or not delivered data is longer than the minimum transfer time is made depending on whether or not the number of delivering bytes is larger than the number of bytes calculated from the minimum transfer time and the transfer rate.

The number of delivering bytes during the minimum transfer time is:

$$\frac{9600 \times 10 \times 10^{-3}}{8} = 12 \text{ (bytes)}$$

assuming that the minimum transfer time is 10 ms and the transfer rate is 9600 bps. Fill bits are inserted in unit of bytes.

In the apparatus, data to be transmitted, received, and stored in the memory during G3 mode are always transferred via FIFO RAM 9. If Fill bits, which do not serve as image data, are stored in RAM 9, the capacity of RAM 9 is wasted.

Furthermore, since the number of Fill bits varies with the capability of the partner machine to which the content of the memory is transmitted, the maximum number of Fill bits must be inserted for storage in the memory, considering the longest possible, minimum transfer time and the transfer rate.

Therefore, in this embodiment, during transmission and storage in the memory in G3 mode, Fill bits are not inserted in FIFO RAM 9 but after image data is read out of FIFO RAM 9 for transmission, they are inserted and delivered out.

In addition, during reception of image data, if more than three byte consecutive 0s are present, byte 0s after the third byte are not written in RAM 9.

(Conversion of Fine to Standard)

In this embodiment, a function to convert a fine mode to a standard mode is provided for transmission of image data stored as MH code in FIFO RAM 9. The line density in the main scan is the same 8 pel/mm for both fine and standard modes. However, the line density in the sub scan mode is 7.7 line/mm for the standard and 3.85 for the fine, i.e., half that of the standard. One line image data stored in FIFO RAM 9 is partitioned by EOL. In this apparatus, in transmitting image data in FIFO RAM 9, the conversion (of the scan line density) of the fine mode to the standard mode is effected each time on line image data in FIFO RAM 9 is transmitted.

Figure 8D:
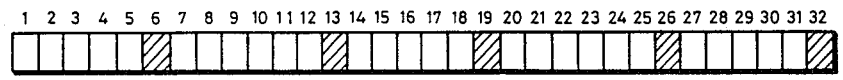
FIGS. 8D, 8E and 8F are views for illustrating a change in number of dots from B4 size to A4 size.
Figure 8E:
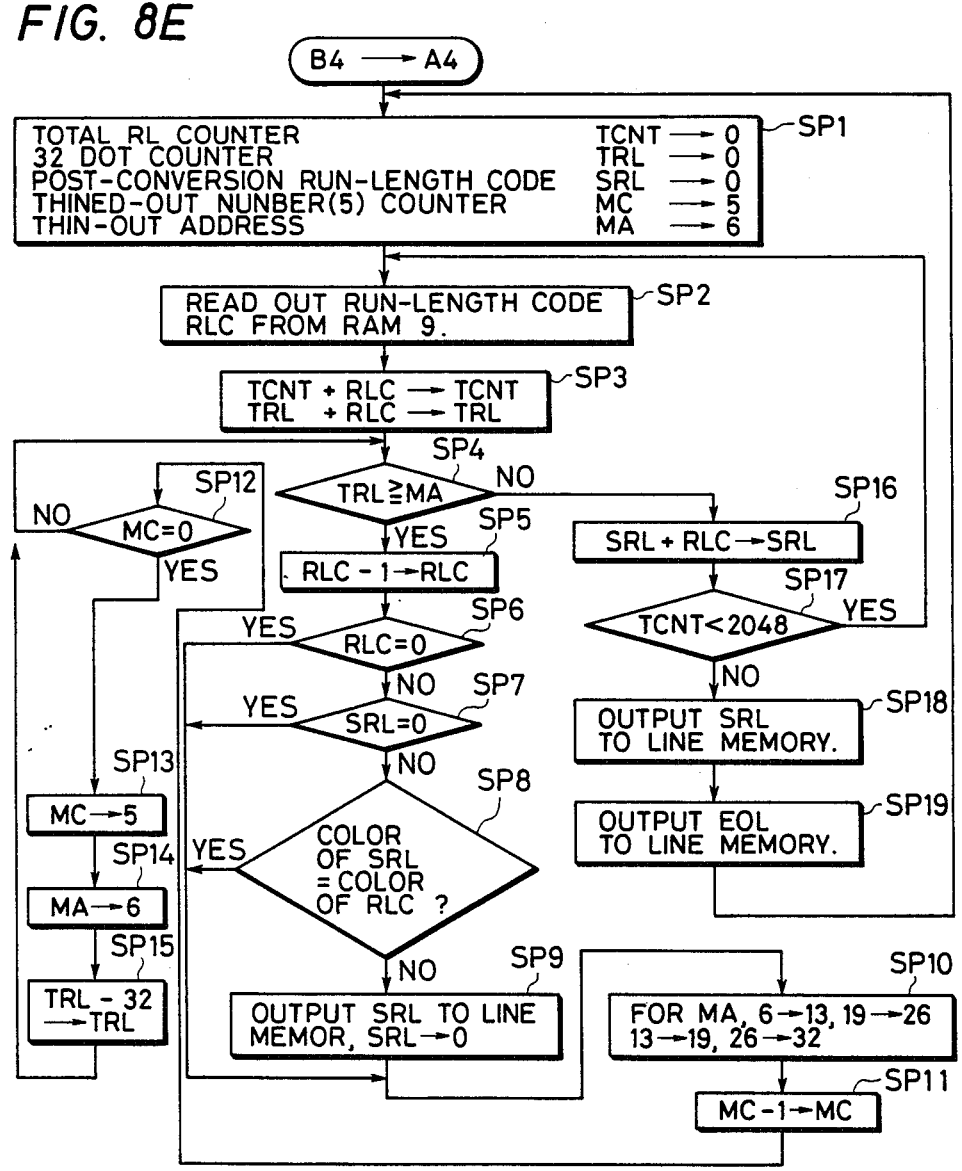
Figure 8C:
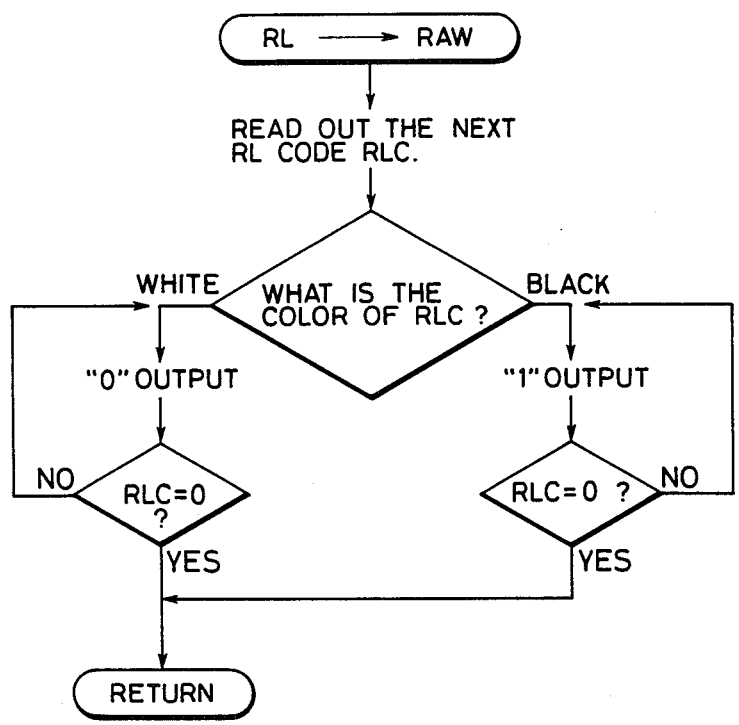
FIG. 8C is a flow chart for converting RL code into raw data.
Figure 8B:
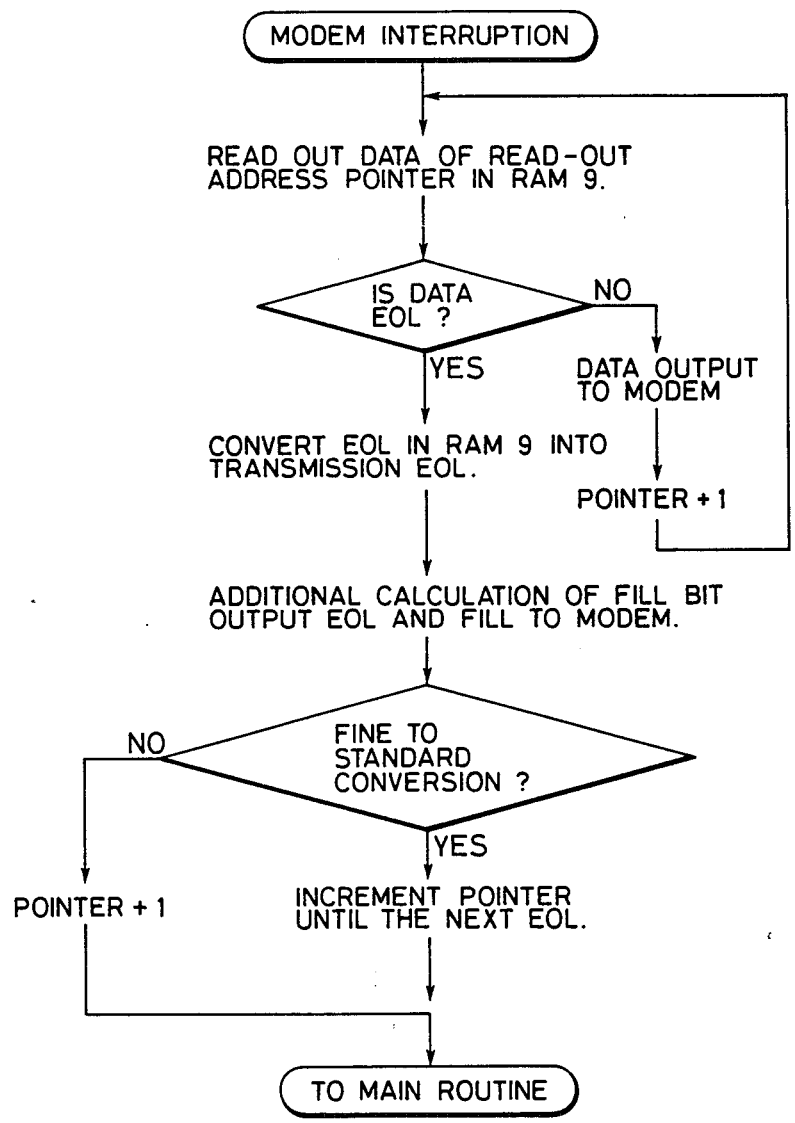
FIG. 8B is a flow chart illustrating the processing of MPU 23 when a data request interruption is received from modem 19.

A flow chart is shown in FIG. 8B for processing or not processing the scan line density conversion upon reception of a data request interruption from the modem.

Upon reception of an interruption, data indicative of the current read address pointer is read out of FIFO RAM 9. If it is not EOL, after the data is outputted to the modem, the pointer is incremented by 1 to repeat data transfer. If EOL is detected, as described previously, EOL in RAM 9 is converted into transmission EOL (Recommendation of CCITT). Thereafter, Fill bits are added if necessary to output EOL and Fill bits to the modem. Then, it is decided if a conversion of the fine mode into the standard mode is requested. If not requested, the pointer is incremented by 1 to terminate reading one line image data. Alternatively, if a conversion of the scan line density is necessary, the pointer is incremented to the next EOL and one line data is deleted to return to the main routine.

(Conversion of RL into Raw data)

In transmitting image data in G2 mode, it is necessary to transmit image data stored as MH code in FIFO RAM 9 in the form of raw data. In the apparatus, such data conversion is conducted by software. To convert MH code directly into raw data is very difficult. Therefore, using the afore-mentioned decoding function, MH code is once converted into RL code which in turn converted in raw data, to accordingly simplify the program.

The conversion of RL code into raw data is performed, for example, as shown in FIG. 8C.

More in particular, "1" is outputted onto the line memory if read-out RLC code is black data. This operation is repeated until RLC code becomes 0. "0" is outputted onto the line memory if read-out RLC code is white data. Similarly, this operation is repeated until RLC code becomes 0. Thus, the conversion of RL code into raw data is achieved.

(Reduction of B4 to A4 by way of software)

In this embodiment, reading is effected by the read-out unit 1 having 2048 bit photosensor elements. Thus, it is possible to transmit a B4 original in 8 pel/mm. It is necessary, if a partner machine has a recording capability of only A4 size, to transmit B4 data by converting it into A4 data (1728 bits). In case of an ordinary transmission of an original, such conversion is processed either optically or electrically at the read-out unit 1. However, in case of memory transmission, use of the reduction function of the read-out unit 1 is impossible due to for example its flow of data. Consequently, in the present embodiment, the reduction is performed by software. First, data stored as MH code in RAM 9 is converted into RL code using the decoding function. Thereafter, a reduction process in the main scan direction of one line data is performed. Reduced RL code is again converted into MH code (in case of G2, into raw data) to transfer it to the modem.

The reduction in the sub-scan direction is performed, as discussed previously, thinning out image data in unit of one lines.

The conversion of the number of dots while converting B4 into A4 for RL code will be described with reference to FIGS. 8D, 8E and 8F.

The number of dots of one main scan line is 2048 for B4 and 1728 for A4. Through factorization of these numbers, a ratio of $32 \times 2^6 : 27 \times 2^6$, i.e., 32:27 is obtained. 2048 dots for B4 are divided into 64 blocks each having 32 dots. 5 dots are thinned out from each block consisting of 32 dots, to thereby obtain 27 dots for each block. FIG. 8D illustrates one block having 32 dots. The 6, 13, 19, 26 and 32nd dots hatched in the figure are thinned out to enable a substantially uniform thinning density in the main scan direction.

A flow chart for such conversion is shown in FIG. 8E. To facilitate the description of the flow chart, an example of the conversion of 32 dot code into 27 dot code will be explained assuming that 32 dot RL code has 8 white dots, 5 black dots, 15 white dots and 4 black dots.

First, at SP1, total RL counter TCNT, 32 dot counter TRL and run length code counter SRL for counting the number of dots after conversion, are initialized to 0 for the line concerned. Thin-out number counter MC for counting the number of dots to be thinned out is set at 5, while thin-out address counter MA is set at 6.

At SP2, the first run-length code RLC of 8 white dots is read out from RAM 9. At SP3, TCNT and TRL are both set at 8. Since TRL=8 is larger than MA=6, RLC of 8 white dots is converted into RLC of 7 white dots (SP5).

Since SRL becomes 0 at RLC=7 white dots, MA becomes 13 and MC becomes 4 at SP10, to thereby return to SP4. Since TRL=8 is smaller than MA=13 in this case, SP16 follows to set SRL at 7 white dots. Since TCNT is smaller than 2048, SP2 follows thereafter to obtain the next RLC=5 black dots, and TCNT and TRL both become 13. Since TRL equals MA=13, RLC becomes 4 black dots at SP6. At SP8, the colors of SRL=7 white dots and RLC=4 black dots differ so that at SP8, data of 7 white dots is outputted to the line memory and SRL is reset at 0. MA and MC are set at 19 and 3, respectively, to accordingly return to SP4 and further to SP16. In this case, SRL is set at RLC=4 black dots. Then, the next RLC=15 white dots is obtained and TCNT and TRL are set at 28. Since 28 is larger than MA=19, RLC=15 white dots is converted into 14 white dots. At SP8, since the color of SRL=4 black dots is different from that of RLC=14 white dots, data of 4 black dots is outputted to the line memory and SRL is reset at 0.

Then, MA and MC are set at 26 and 2, respectively. At SP4, since TRL=28 is still larger than MA=26, data of 14 white dots is further converted into 13 white dots. At this time, since SRL is 0, the judgement and output at SP8 and SP9 are not effected, but MA and MC are respectively set at 32 and 1 at SP10 and SP11.

Again at SP4, since MA=32 is larger than TRL=28 in this case, SRL is set at 13 white dots at SP16. After the next RLC=4 black dots is read out, 13 white dots are outputted at SP9, and similarly to the above, 3 black dots are outputted thereafter.

Figure 8F:
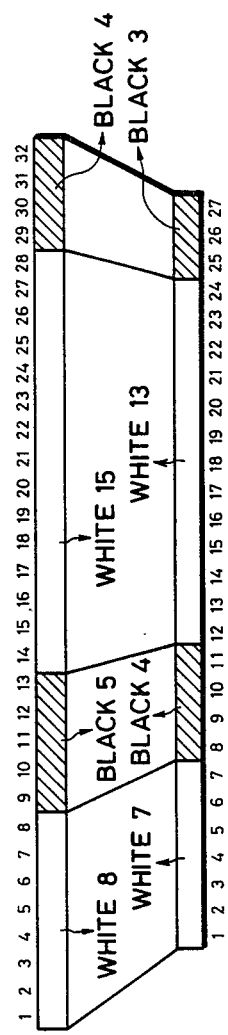

As seen from the foregoing, the upper data in FIG. 8F, i.e., 8 white, 5 black, 15 white and 4 black dots, are converted in a substantially uniform way into RLC of 7 white, 4 black, 13 white and 3 black dots.

SP13, SP14 and SP15 in the flow chart show initialization of MC, MA and TRL after completion of processings of one block of 32 dots. SP15 has also a control function for the case where RLC extends between two blocks. SP18 indicates the operation to output the last RLC in one line to the line memory.

As above, it is possible to convert the number of dots in the main scan direction using RLC only.

(Operation Mode)

A number of operation modes are available as shown in the following table for transmission/reception and transfer of image data. The flow of data and its coding for each mode will now be described with reference to the drawings.

TRANSMISSION MODES

| | | |
|---|---|---|
| G3 original transmission | MH RAM 9 usable | M1 |
| G3 original transmission | MR RAM 9 usable | M2 |
| G3 original transmission | MH RAM 9 unusable | M3 |
| G3 memory transmission | MH | M4 |
| G2 memory transmission | | M5 |
| G2 original transmission | | M6 |
| RECEPTION MODES | | |
| G3 reception | MH RAM 9 usable | M7 |
| G3 reception | MR RAM 9 unusable | M8 |
| G3 reception | MH RAM 9 usable | M9 |
| G3 reception | MH RAM 9 unusable | M10 |
| G2 reception | | M11 |
| OTHER MODES | | |
| memory storage | | M12 |
| memory copy | | M13 |
| original copy | | M14 |

Figure 9A:
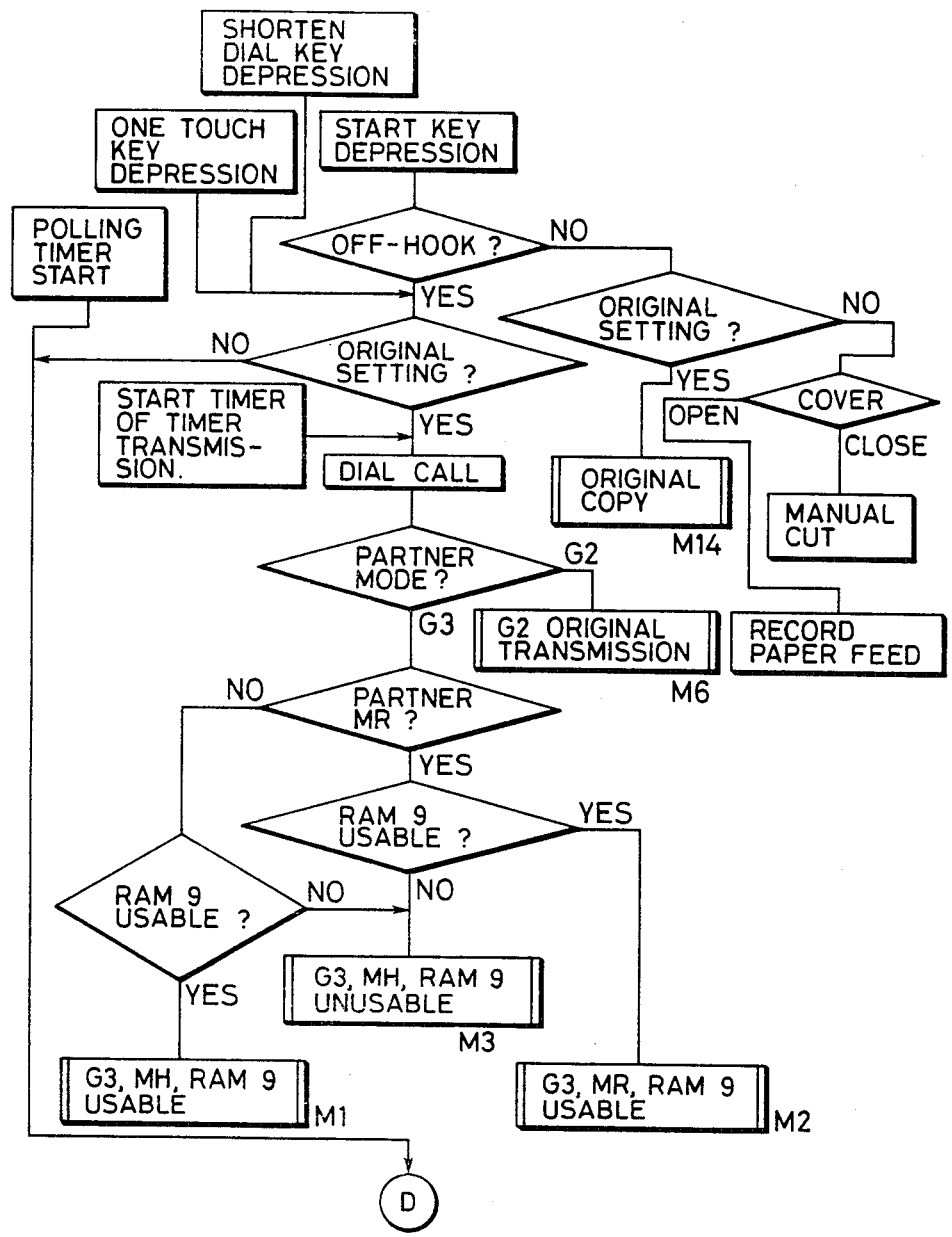
FIGS. 9A, 9B and 9C are flow charts for determining one of 14 operation modes of CPU 23.
Figure 9B:
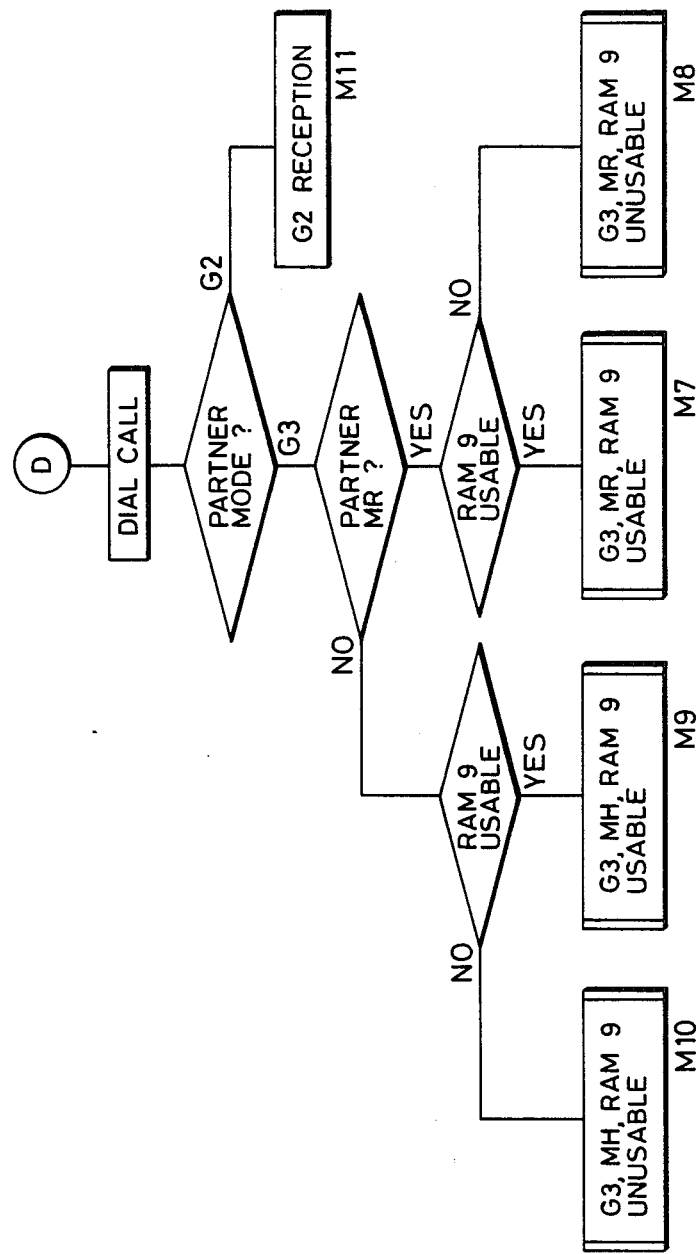
Figure 9C:
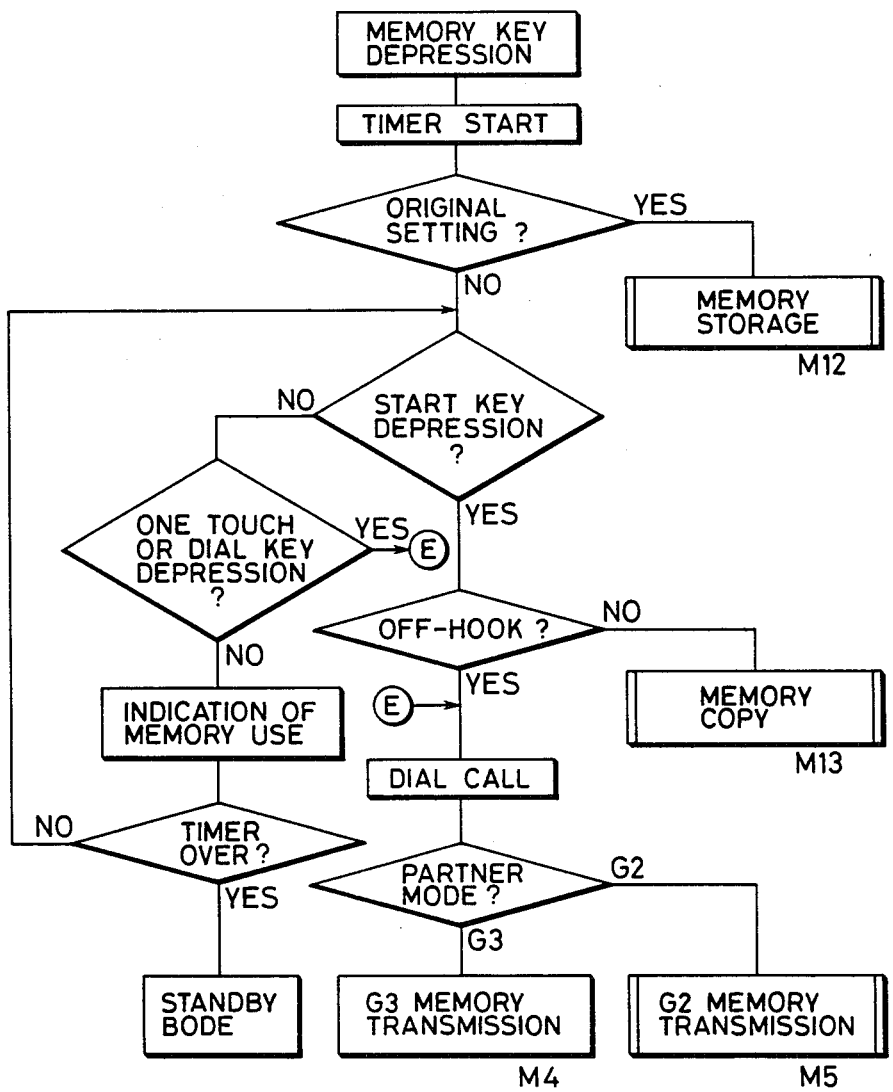

A flow chart of judgement algorithm of MPU 23 to be used for determination of one of the above 14 operation modes M1 to M14, is shown in FIGS. 9A, 9B and 9C.

Figure 10:
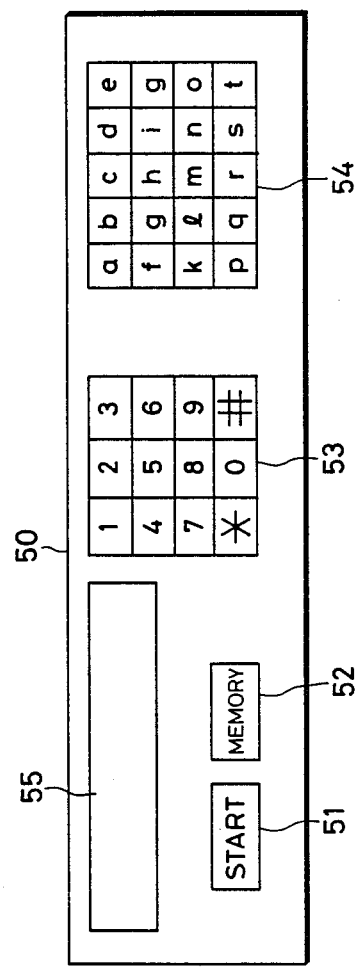
FIG. 10 is a plan view of an operation unit 50.

In the present embodiment, the operation mode is initiated upon actuation of a start key 51, one touch dial key 54, shorten dial key 53 or memory key 52 on the operation panel 50 shown in FIG. 10.

A judgement/branch is initiated based on the outputs from a sensor 31 detecting presence or absence of an original, sensor 32 detecting the on-hook/offhook state of a telephone, and roll paper cover sensor 33.

Pre-procedure signals prior to a message (image data) communication in facsimile communication enable to judge whether a partner machine is in G3 mode or G2 mode. Simultaneously therewith, it is possible to know whether the partner machine has an MR coding function or has only an MH coding function.

Furthermore, it can be judged if FIFO RAM 9 is usable or not in a message communication based on its work state of storage of the sender machine. If image data is being stored in RAM 9, it is unusable, while if image data is not stored in RAM 9, it is usable.

The operation modes to be decided by the flow chart are respectively designated by references M1 to M14.

First, upon depression of the start key, it is checked whether the telephone is in an on-hook or off-hook state as shown in FIG. 9A. In case of an off-hook state and if an original is present at the transmission position, original copy mode M14 follows. If an original is not present and the roll paper cover is closed, then the roll paper cutter is actuated. If the roll paper cover is open, the roll paper is fed by a predetermined amount.

In case of an off-hook state and if an original is present, then one of transmission modes M1, M2, M3 and M6 follows depending on the partner machine mode and depending on whether RAM 9 is usable or unusable. In case of an off-hook and an original is not present, a branch routine for reception modes as shown in FIG. 9B follows. In the figure, one of modes M7 to M11 is selected depending on the partner machine mode and depending on whether RAM 9 is usable or not.

FIG. 9C shows a mode branch routine when the memory key 52 is depressed.

Upon depression of the memory key 52, a timer in the form of software starts operating. If an original is placed during this time count operation, memory storage mode M12 follows to store image data of the original into RAM 9.

If the start key 51 is depressed without an original on the read-out unit 1 and if the machine is in an on-hook state, memory copy mode M13 follows where image data in RAM 9 is recorded at the record unit 17.

If the machine is in an off-hook state, one of memory transmission modes M4 and M5 follows. If the one touch key 54 and shorten dial key 53 are depressed, one of memory transmission modes M4 and M5 follows irrespective of the hook state. Memory transmission modes M4 and M5 are used respectively for G2 and G3 partner machines.

If the memory key is depressed but no other keys are actuated without an original on the read-out unit, then the storage amount of image data in RAM 9 is displayed on the display 55 (FIG. 10) and the program returns to a standby mode after the software timer counts up.

The flow of image data in each mode M1 to M14 will be described hereinunder.

(Mode M1)

G3 original transmission, MH, RAM 9 usable

The flow of image data in mode M1 will be explained with reference to FIG. 11.

One line image data read by the read-out unit 1 upon reception of a read-out command from MPU 23, is converted into RL code and stored into RAM 3. Under control of MPU 23, data in RAM 3 is directly transferred to two line buffers RAM 5 and RAM 7 alternately for each one line. RL codes read out of two line buffers are encoded into MH code to write it in FIFO RAM 9. Under control of MPU 23, upon reception of a data request interruption from the modem 19, MH code in FIFO RAM 9 is transferred to the modem one byte after another. At this time, the minimum transfer time for each line is calculated to insert Fill bits.

Character information such as sender, transmission time and so on to be added to the head of the image is obtained in such a way that raw image data 25 outputted from CG 25 is converted into MH code and transferred to FIFO RAM 9.

In the figure, all of the data transfer are performed via the bus 24 of MPU 23 except for the transfer from the read-out unit 1 to RAM 3 and from the modem 19 to NCU 21.

The interval of data request interruptions from the modem 19 varies with the transfer rate. Since data transfer is effected in unit of bytes, an interruption occurs every $8/9600 = 0.83 \times 10^{-3}$ sec, in case of 9600 bps for example.

At the end of data transfer from RAM 3 to RAM 5 and RAM 7, MPU 23 outputs a read-out command to the read-out unit 1. While MPU 23 performs an encoding process ENC and interruption process, the read-out unit 1 reads an original, and raw data is converted into RL data.

(Mode M2)

G3 original transmission, MR, RAM 9 usable

The image data flow, which is substantially the same as in mode M1, is shown in FIG. 12A. The difference is that the code after ENC 23-1 is MR code. However, data from CG 25 is outputted from ENC 23-1 is in the form of MH code. For instance, if a character of 24×16 dots is to be added to the head of the image, data for 24 lines is transferred in the form of MH code.

Figure 12B:
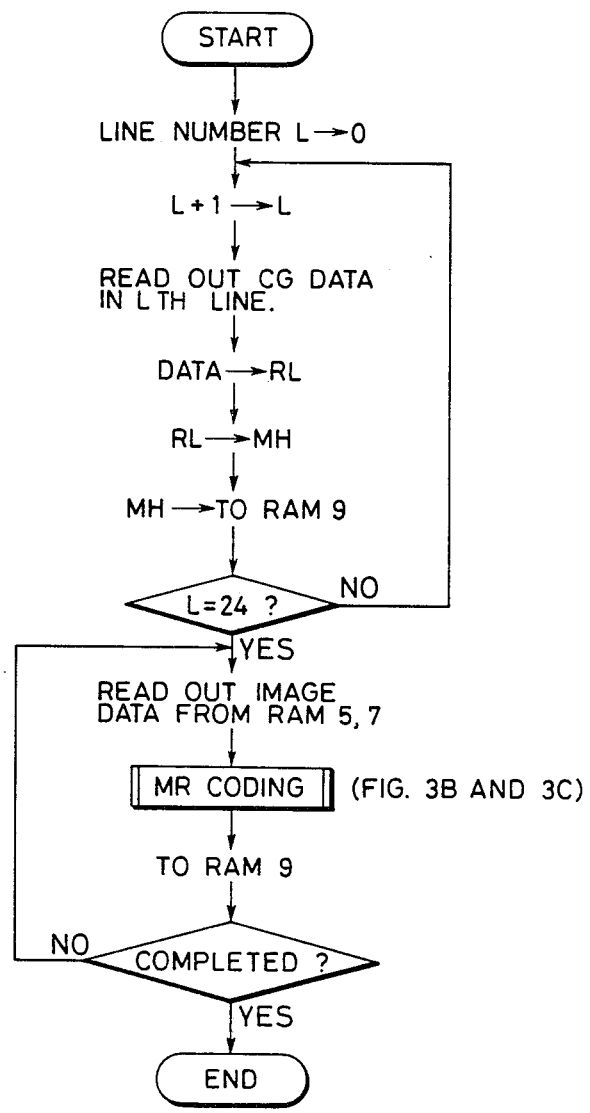
FIG. 12B is a flow chart for storing MH code in the form of CG data and MR code in the form of image data, respectively in RAM 9.

A program for storing CG data of MH code and image data of MR code is shown in FIG. 12B. First, the number L of lines of CG data is initialized. Starting from the top line, each line data is read, converted from raw data into RL code and further into MH code, and stored in RAM 9.

After completion of such operations for 24 lines, image data in RL code is read out of either RAM 5 or RAM 7. RL code in each line is converted, based on the MR encoding routine shown in FIGS. 3B and 3C, into MR code to store it in RAM 9.

(Mode M3)

G3 original transmission, MH, RAM 9 usable

Figure 11:
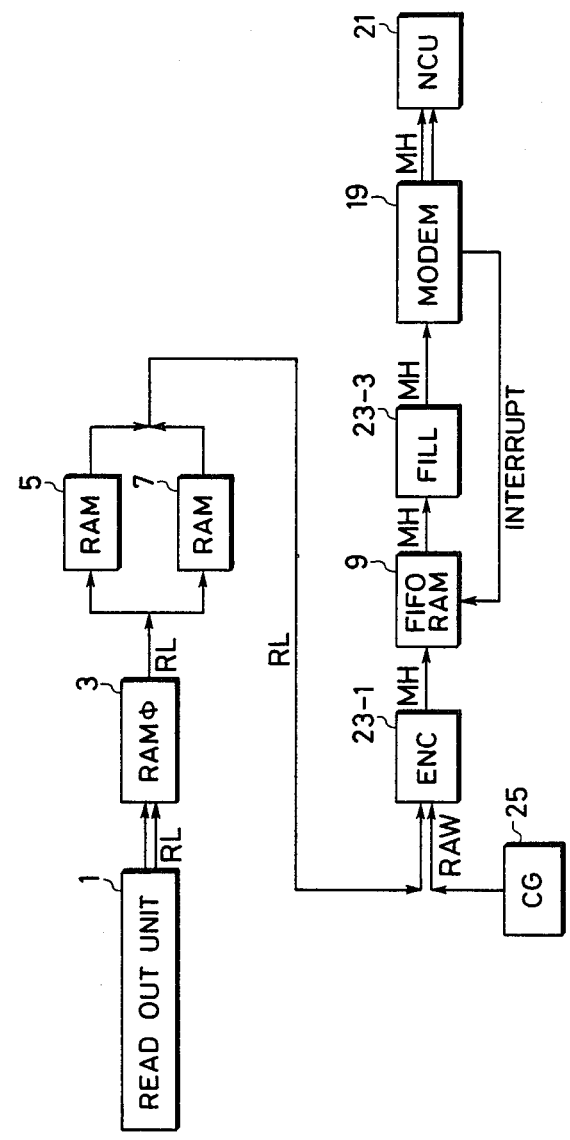
FIG. 11 is a block diagram showing a flow of image data in mode M1.
Figure 13:
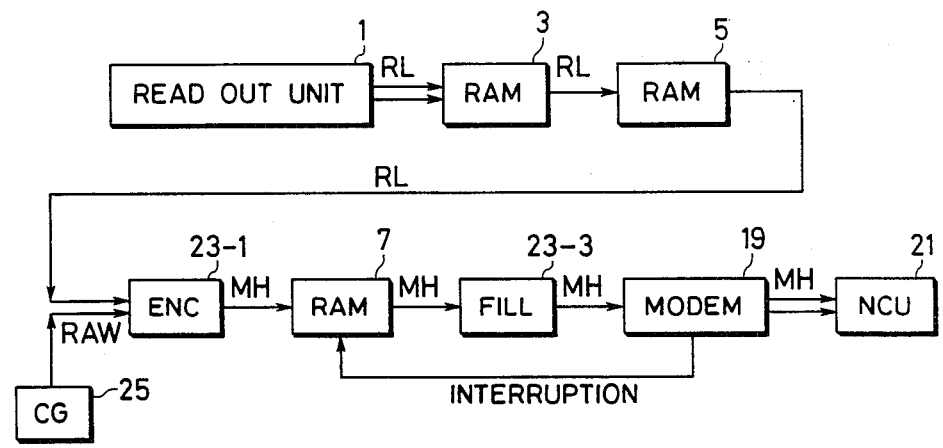
FIG. 13 is a block diagram showing a flow of image data in mode M3.

The flow of image data is shown in FIG. 13, As different from the case where RAM 9 is usable as shown in FIG. 11, RAM 7 used as the line buffer is here used as a line buffer for MH code. Therefore, there is only a single line buffer RAM 5 and encoder ENC 23-1 can handle only one line data. Therefore, MR transmission is impossible in case RAM 9 is unusable.

The reason is that it is necessary for MR encoding to prepare line buffers for two lines, i.e., currently encoding line and reference line.

(Mode M4)

Figure 14A:
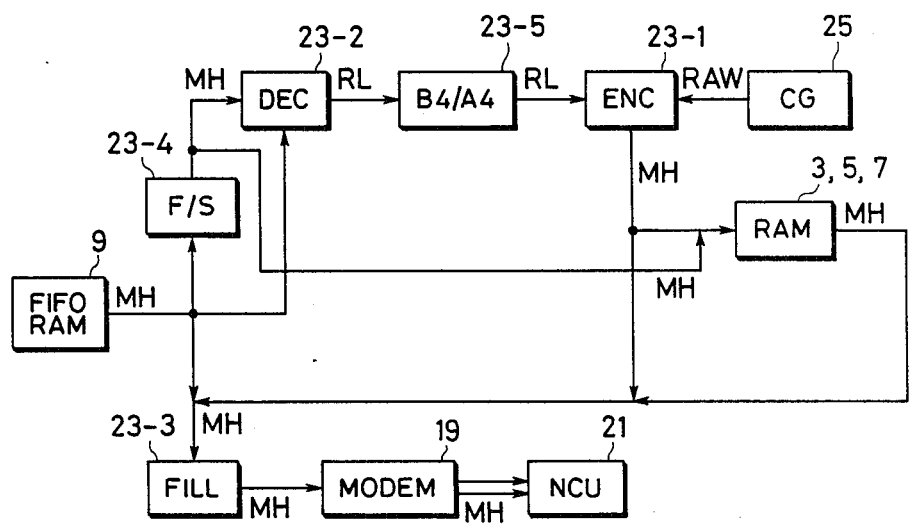
FIG. 14A is a block diagram showing a flow of image data in mode M4.
Figure 14B:
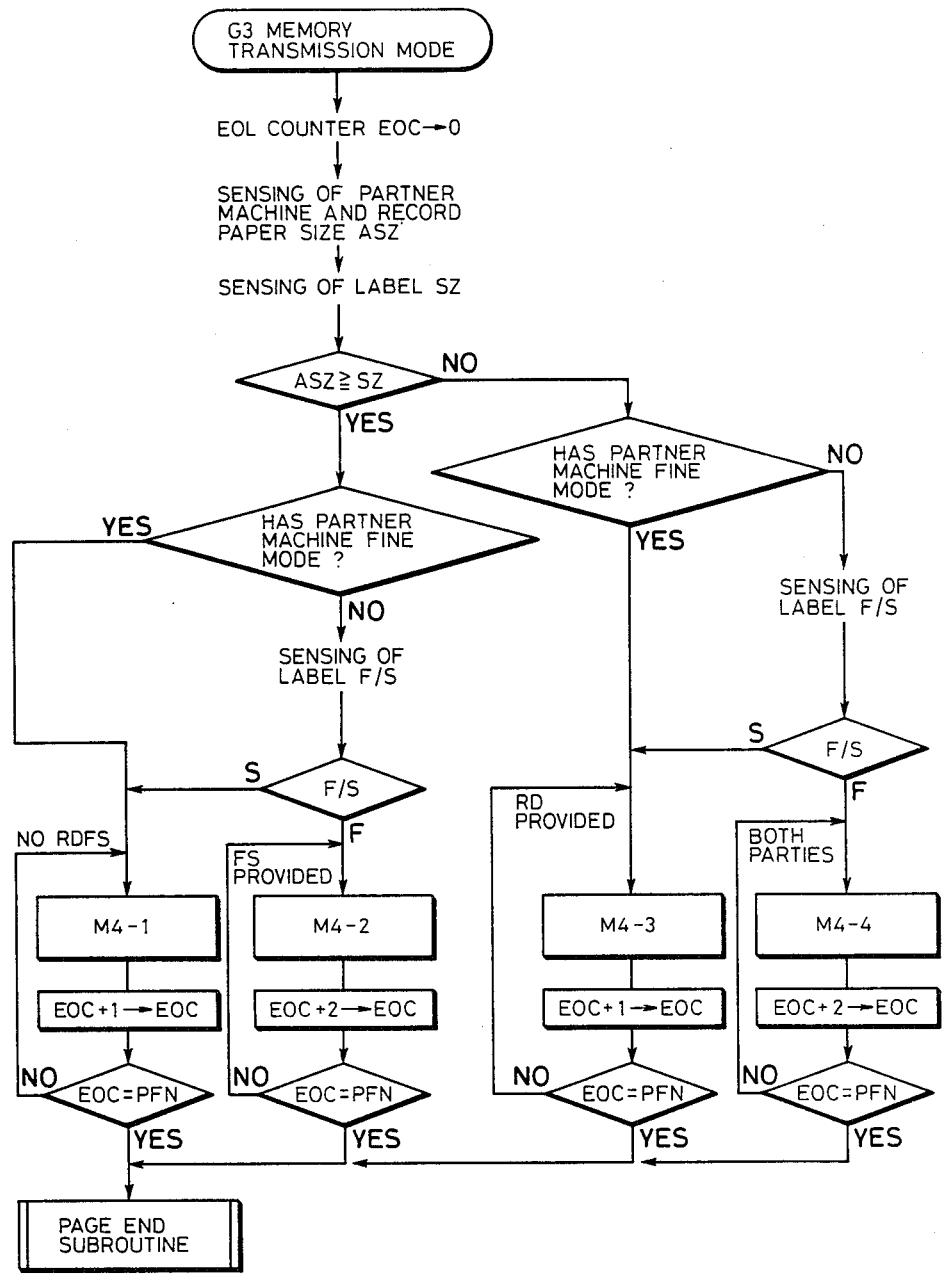
FIG. 14B is a flow chart showing how mode M4 is branched to one of modes M4-1 to M4-4 in conformity with a partner machine.
Figure 14C:
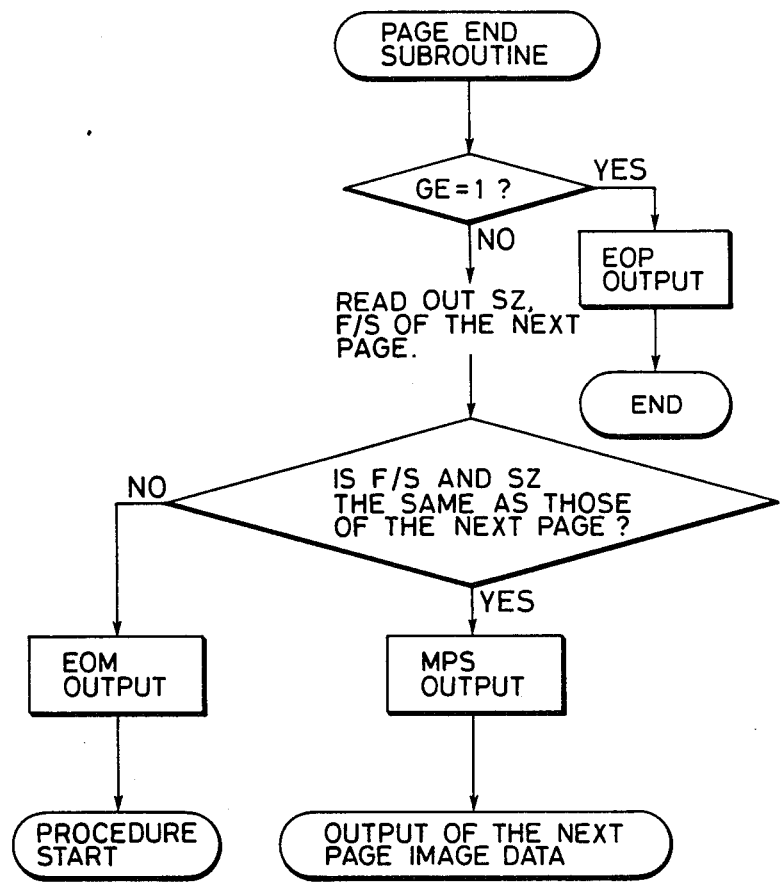
FIG. 14C is a flow chart showing a page end subroutine.

G3 memory transmission, MH ... FIGS. 14A, 14B and 14C

Figure 21:
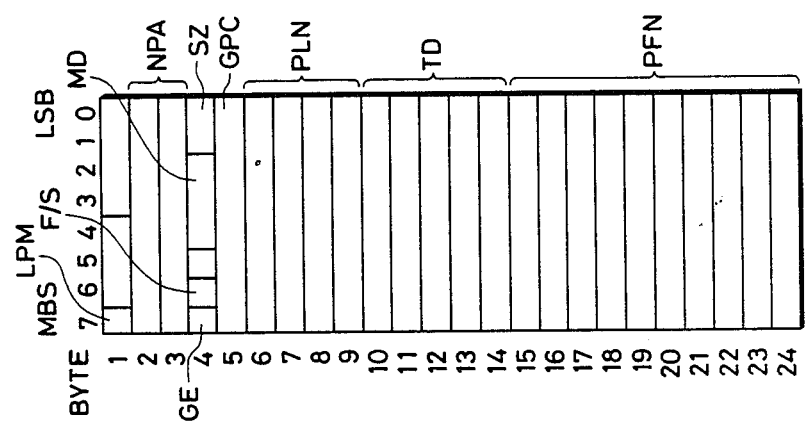
FIG. 21 shows a format of a file management label appended to the page head in RAM 9 while storing image data in RAM 9.

The flow of image data in mode M4 is shown in FIG. 14A. Image data read in the fine or standard mode is stored in FIFO RAM 9 in the form of MH code. At the top of a page, various information associated with image data is stored as a label as shown in FIG. 21. Such information is for example read size SZ (the number of dots in the main scan) of image data, fine or standard mode F/S (the main scan line density), the number PFN of EOLs in the page and the like.

In case the record paper size of the partner machine is smaller than read size SZ, it is necessary to perform the above-described conversion of the number of dots in the main scan. In addition, in case the partner machine has only the standard mode although image data has been stored in RAM 9 in the fine mode, it is necessary to perform the above-described scan line density conversion.

FIG. 14B shows a branch routine in such cases. In the figure, first counter EOC for counting EOLs is set 0. The record paper size ASZ of the partner machine is sensed during the preprocedure to compare it with label SZ. If ASZ is equal or larger than SZ, then mode M4-1 or M4-2 is selected. In this case, conversion of the number of dots in the main scan line is not necessary.

If the partner machine has not the fine mode although image data has been stored in RAM 9 in the fine mode, conversion of the sub scan line density is also necessary, and mode M4-2 or M4-4 is selected.

That is, in M4-1, both conversions of the main scan dot number and sub-scan line density are not required. In M4-2, only conversion of the sub-scan density conversion is required. In M4-3, only conversion of the main scan dot number is required, while in M4-4, both conversions are required.

Although the detailed description for the flow of image data for each mode will be given later, it is simply mentioned here that EOL counter EOC is incremented by 1 in modes M4-1 and M4-3, while EOC is incremented by 2 in modes M4-2 and M4-4 and that when EOC equals PFN representative of the number of EOLs in the page, a page end subroutine follows.

In the page end subroutine shown in FIG. 14 C, label GE is checked if it represents the last page among a number of pages stored in RAM 9. If the page concerned is the last one among a number of pages, EOP indicating the end of transmission is outputted to the partner machine and the transmission is terminated. If the page concerned is not the last one, SZ and F/S of the next page are read. In case of the same F/S and SZ as of the preceding page, MSP indicating that the next page is transmitted in the same mode, is outputted. Alternatively, if F/S and SZ are different from those of the preceding page, EOM indicating that the pre-procedure should be started again from the beginning, is sent to the partner machine.

The flow of image data for each mode M4-1 to M4-4 will be described hereinunder.

(M4-1)

Conversion of the main scan dot and sub-scan line density is not conducted.

Image data in RAM 9 is added with Fill bits at Fill 23-3 and transferred to the modem 19 via NCU 21. Raw data from CG 25 is not directly transferred to Fill 23-1 but is MH coded at ENC 23-1.

(M4-2)

Conversion of the sub-scan line density is conducted.

Under control of MPU 23, MH code from RAM 9 is converted from that of the fine mode to that of the standard mode in the form of MH code at F/S 23-4, i.e., data for every second line is deleted, to output the result to RAM 3, RAM 5 and RAM 7. MH data in RAM 3, RAM 5 and RAM 7 is added with Fill bits at Fill 23-3 and transferred to the modem 19. Raw data outputted from CG 25 is also outputted to Fill 23-3 via ENC 23-1 and RAMs 3, 5 and 7.

(M4-3)

Conversion of the main scan dot number is conducted.

Under control of MPU 23, image data in MH code is read out of RAM 9 and converted in RL code at DEC 23-2 to conduct conversion from B4 into A4 in the form of RL code. Converted RL code is again converted at ENC 23-1 into MH code which is outputted to RAMs 3, 5 and 7 used as FIFO memories. Thereafter, Fill bits are added at Fill 23-3 to transfer the result to the modem 19. Raw data outputted from CG 25 is also converted into MH code at ENC 23-1 to transfer to Fill 23-3 via RAMs 3, 5 and 7.

(M4-4)

Both conversions are conducted.

Under control of MPU 23, MH data in FIFO RAM 9 is subjected to F/S conversion in the form of MH code, converted into RL code at DEC 23-2, and subjected to B4/A4 conversion. Converted RL code is again converted to MH code at ENC 23-1 which is transferred to RAMs 3,5 and 7. The output of CG 25 is also transferred to Fill 23-3 via ENC 23-1 and RAMS 3, 5 and 7.

(Mode M5)

Figure 15:
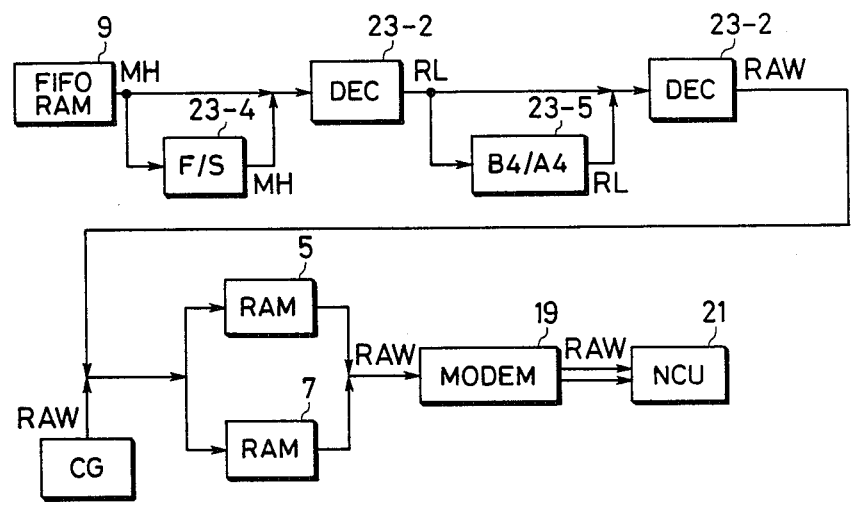
FIG. 15 is a block diagram showing a flow of image data in mode M5.

G2 memory transmission ... FIG. 15

Under control of MPU 23, MH code is read out of FIFO RAM 9 to decode it into RL code and hence into raw data RAW to transfer it to RAMs 5 and 7 alternately for each one line. Raw data is sequentially read out of RAMs 5 and 7 to transfer it to the modem 19. Mode conversion from the fine to the standard is performed at F/S 23-4 between RAM 9 and DEC 23-2, while reduction conversion of the size is performed at B4/A4 23-5 between two DECs 23-2.

Output data from CG 25 is transferred to the modem 19 via RAMs 5 and 7 in the form of raw data RAW. In this case, however, the output data from CG 25 is not subjected to thinning scan lines, but is delivered at 7.7 line/mm in the sub-scan direction to make the character size double that in G3 mode. The reason is to ensure a reliable reading of transmitted information in spite of a greatly degraded image quality due to analog communication in G2 mode.

(Mode M6)

Figure 16:
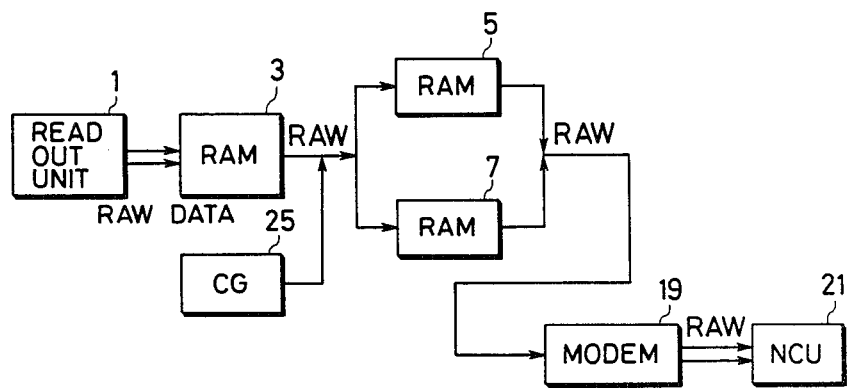
FIG. 16 is a block diagram showing a flow of image data in mode M6.

G2 original transmission . . . FIG. 16

All of the data transfer are performed in the form of raw data. One line image data read out by the read-out unit 1 upon reception of a read command from MPU 23, is written in RAM 3 in the form of raw data. Under control of MPU 23, raw data in RAM 3 per se is transferred to two line buffers RAM 5 and RAM 7 alternately for each line. Upon reception of a request interruption from the modem, raw data is transferred from RAM 5 or RAM 7 to the modem 19 one byte after another.

Character information such as sender particulars to be added to the top of an image is transferred to RAMs 5 and 7 from CG 25 in the form of raw data.

In G2 mode, 1728 bit image data including synchro signals is written in RAMs 5 and 7. Image signals corresponding to these synchro signals are produced under control of MPU 23.

(Modes M7 and M8)

Figure 17:
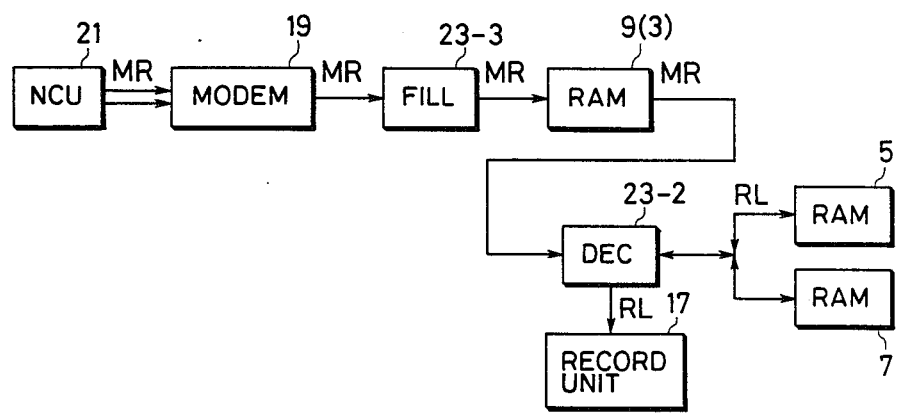
FIG. 17 is block diagram showing a flow of image data in modes M7 and M8.

G3 reception, MR, RAM 9 unusable (usable) . . . FIG. 17

As MR code is received under control of MPU 23 from the network via NCU 21 and modem 19, Fill bits are first deleted and thereafter, MR code with Fill bits deleted is transferred to RAM 9 in case of empty storage thereof or to RAM 3 in case of memory storage in RAM 9. MR code is sequentially read from RAM 9 or RAM 3, decoded into RL code and thereafter transferred to RAM 5 and RAM 7 alternately for each line. Simultaneously therewith, RL code is transferred to the record unit 17 to record it. Decoded RL code is transferred to RAM 5 and RAM 7 to store it for use as preceding line information in MR coding.

(Modes M9 and M10)

Figure 18:
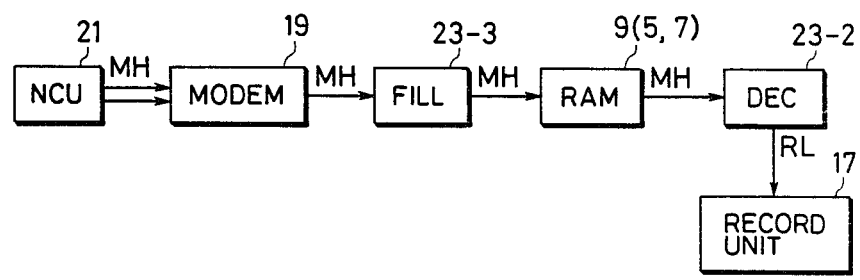
FIG. 18 is a block diagram showing a flow of image data in modes M9 and M10.

G3 reception, MH, RAM 9 usable (unusable) . . . FIG. 18

As MH code is received under control of MPU 23 from the network via NCU 21 and modem 19, Fill bits are first deleted and transferred to the form of MH code into RAM 9 if it is unusable or to RAM 3 if RAM 9 is unusable. RAM 9 fetches MH code from RAMs 3, 5 and 7 and converts it into RL code to transfer it to the record unit 17 for recording.

(Mode M11)

Figure 19:
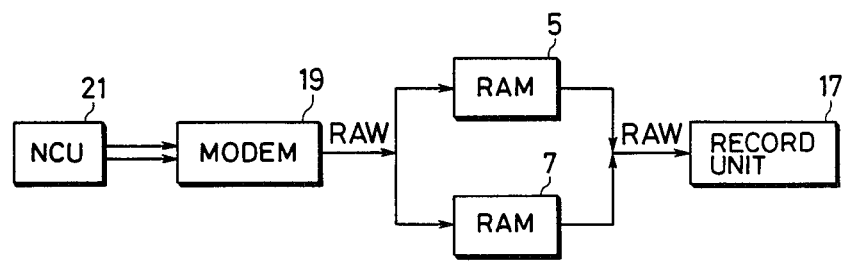
FIG. 19 is a block diagram showing a flow of image data in mode M11.

G2 reception . . . FIG. 19

Non-compressed, raw data is transmitted in G2 mode. Therefore, raw data received under control of MPU 23 from the network via NCU 21 and modem 19 is transferred to line buffers RAM 5 and RAM 7 alternately for each line. Raw data is sequentially read out of RAM 5 RAM 7 to transfer it to the record unit 17 for recording.

A 1728 bit image signal corresponding to one line and demodulated by the modem 19 is written in RAM 5 and RAM 7. Since the image signal includes signals demodulated from synchro signals, transfer of image signal to the record unit 17 under control of RAM 23 is performed by removing the signals corresponding to the synchro signals.

(Mode M12)

Figure 20:
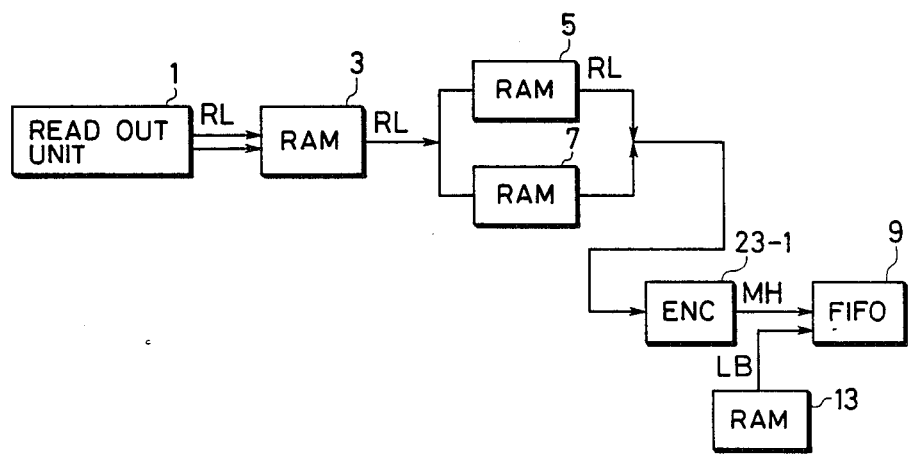
FIG. 20 is a block diagram showing a flow of image data in mode M12.

Memory storage . . . FIG. 20

The processes up to the storage in FIFO RAM 9 in the form of MH code is substantially the same as those in Mode 1. The difference is that data from CG 25 is not present and that file management label LB is added to the top of a page during transference to RAM 9 from RAM 13.

The description is here directed to such labeling.

Label LB is constructed of 24 bytes as shown in FIG. 21. LPM and NPA are allocated in the first to third bytes, the former indicating that data affixed therewith is the last page of image data, and the latter indicating the location where the next page head address is stored. In the fourth byte, information on each page is stored. MSB of the fourth byte stores information GE, which in case of image data is divided in unit of groups other than in unit of pages, indicates if the page concerned is the last page of the group or not. F/S stores scan line density data indicating if it is a standard one (3.85 lines/mm) or a fine one (7 line/mm).

MD stores information on the code type of data stored in RAM 9, i.e., MH, MR, RL, RAW or ASCII. SZ stores information on the read-out size of data in RAM 9, i.e., A4, B4 or A3.

Stored in the fifth byte is GPC which indicates the page number in the group in case that image data is divided in units of groups. In the sixth to ninth bytes, the total number PLN of lines is stores. In the tenth to fourteenth bytes, the time when memory storage was performed is stored. The "minute", "hour", "day", "month" and "year" are respectively stored in the 10, 11, 12, 13 and 14th bytes. In the 15th to 24th bytes, encoded file name PFN of the page concerned is stored.

Decision of a mode, addition of information and the like during memory transmission and memory copy are achieve based on information of label LB. As to time data, the time when memory storage was performed is printed as a header during memory copy based on information of label LB, while the transmission time is transmitted during memory transmission neglecting information of label LB. The reason is that: if time designated transmission is performed, the printed time on the received image is so made not to become the time when it was stored in RAM 9 but to become the time when actually transmission was started.

Figure 22:
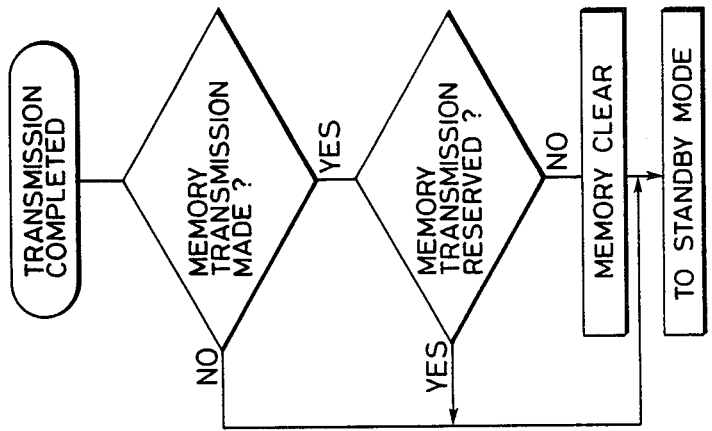
FIG. 22 is a flow chart for automatically clearing image data in RAM 9.

Image data and label LB once stored in RAM 9 are manually cleared by the operator or automatically cleared. The flow of automatic clear is as shown in FIG. 22.

Memory clear is not effected after operation of memory copy.

(Mode M13)

Figure 23A:
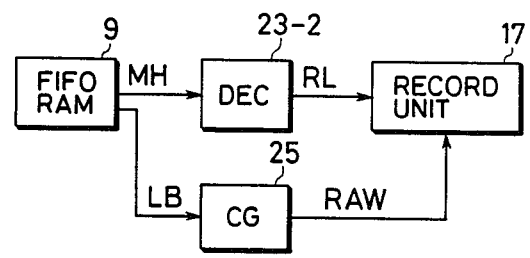
FIG. 23A is a block diagram showing a flow of image data in mode M13.

Memory copy . . . FIG. 23A

MH code is sequentially read out of DRAM 9 under control of MPU 23 and converted into RL code to transfer it to the record unit 17 for recording. As to header information, the character code is converted into raw data under control of MPU 23 to transfer it to the record unit 17 for recording. As to the time in the header, the time when memory storage was effected and which is being stored in management label LB in RAM 9, is converted into an image by mean of CG 25 to record it at the record unit 17.

Figure 23B:
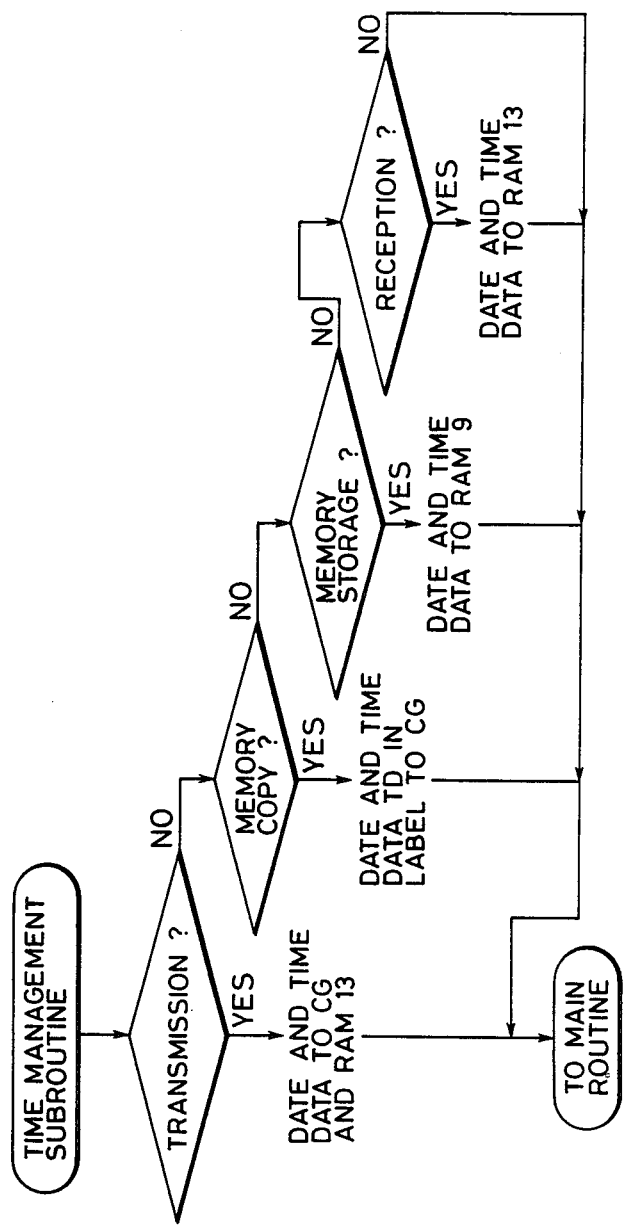
FIG. 23B is a flow chart showing a time management subroutine.

A time management subroutine is shown in FIG. 23B. First, in transmission mode, data and time data of the clock 27 (FIG. 1) under management of MPU 23 is outputted to CG 25 to transmit the transmission time together with image data. Simultaneously therewith, the time as well as the telephone number of the partner is stored in communication management RAM 13. In case of the operation of memory copy, date and time data TD in label LB is outputted to CG 25. In case of the operation of memory storage, date and time data of the clock is outputted as data TD in RAM 9. In case of reception, data of the clock as well as the telephone number of the partner is stored in RAM 13. In case of the operation of original copy, date and time data is not considered at all.

(Mode M14)

Figure 24:
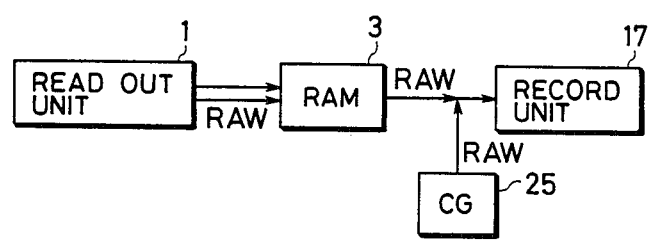
FIG. 24 is a block diagram showing a flow of image data in mode M14.

Original copy ... FIG. 24

One line image data read by the read-out unit 1 upon reception of a read-out command from MPU 23, is written in RAM 3 in the form of raw data RAW. Raw data is sequentially read out of RAM 3 under control of MPU 23 to transfer it to the record unit 17 for recording. Output data from CG 25 is transferred to the record unit 17 in the form of raw data for recording.

As seen from the foregoing description of each transmission mode of this embodiment, all or part of RAMs 3, 5 and 7 for temporarily storing the output from the read-out unit 1 are used as the buffer memory for temporarily storing encoded image data, in case that image data is present in FIFO RAM 9.

Accordingly, it is possible to transmit an original or data in RAM 9 while RAM 9 is used, without providing an additional buffer memory.

As seen from the foregoing, the image transmission apparatus of the present invention comprises: read-out means for reading an image and coverting it into an image signal; first storage means for temporarily storing said image signal; encoding means for compression-encoding the image signal in said first storage means; second storage means for storing said encoded image data; and transmission means for transmitting said encoded image data, wherein said first storage means is used for a buffer memory for temporarily storing said encoded image data in case image data is present in said second storage means.

With the construction as above, it is possible to transmit a compression-encoded, read-out signal of an original without providing an additional buffer memory even in case image data is present in second storage means. In addition, it is possible to transmit a compression-encoded signal even if image data in second storage means is a raw image signal.

The communication apparatus of the present invention as described previously comprises: storage means for storing transmission data; and transmission means for transmitting said transmission data, said storage means storing, together with said transmission data, time and data when said transmission data was stored. Therefore, it is possible to read out later what time data in storage means was stored therein. So, proper information whether data is to be erased or not can be supplied to the operator.

Furthermore, data regarding a transmission time is transmitted together with data in storage means while time and data of storage are recorded during a copy operation. Thus, it is convenient for both sender and receiver.

The image transmission apparatus of the present invention as described above comprises: read-out means for reading an image and converting it into an image signal; storage means for storing said image signal in various signal forms; and transmission means for transmitting said image signal; said storage means storing, together with said image signal, information regarding the signal form of said image signal.

With the construction as above, it is possible to match the transmission type at the sender in conformity with the signal form of an image signal capable of being received at the partner. Therefore, for the partner capable of receiving for example only a non-compressed image signal, it is possible to know such non-compressed image signal, based on information in storage means, and to accordingly transmit after expansion processing. Alternatively, if the partner can receive a signal having the same signal form as that stored in the sender, it is possible to transmit such signal without subjecting it to any additional processing. Thus, various processings are possible which improve the capability of communication to a large extent.

The transmission apparatus of the present invention as described above is provided with erasure means for erasing already transmitted data after transmission data stored in storage means is transmitted. Thus, it is possible to erase data without any work from the operator and store new data in the erased location. Thus, effective use of storage means is possible.

Furthermore, as described with FIG. 15, in G2 memory transmission mode, image data stored in a fine mode is subjected to reduction of the scan line density for transmission, while image data stored in B4 read-out is subjected to reduction to A4 for transmission. However, character data from CG 25 is not subjected to reduction in the amount of data. Thus, with the character size formed at the partner being doubled in its height, it is possible to compensate for degradation of the quality of image in G2 mode and reliably read information on the sender and transmission time a the partner.

According to the image transmission apparatus of the present invention as described in detail in the foregoing, character data is not subjected to reduction in the amount of data even when the amount of image data in storage means is subjected to reduction. Therefore, irrespective of the type of transmission mode, it is possible to reliably read character data at the partner.

The image transmission apparatus of the present invention comprises: read-out means for reading an image and converting it into an image signal; encoding means for compression-encoding said image data; storage means for storing encoded image data; and transmission means for transmitting said image data in said storage means; whereby said storage means stores EOL code indicating the end of one line of said image data in a predetermined format, and said transmission means transmits, together with said image data, said EOL code in a different format from said predetermined format.

With the construction as above, the processing after the line end at said transmission means becomes easy. Specifically, by setting the code length of EOL code in said storage means longer than the maximum code length of image data, or longer than the number of bits parallel-processed at said transmission means, it is possible to detect EOL code very easily.

The present invention is not intended to be limited to the above embodiment, but various applications and modifications are possible within the scope of the appended claims.

What is claimed is:

1. An image transmission apparatus comprising:
   read-out means for reading an image in a predetermined density and converting said image into an image signal;
   storage means for storing at least one page image signal;
   means for generating character data regarding a sender and transmission time; and
   conversion means for converting an amount of data of said image signal in accordance with a reproduction density at a communication partner;
   whereby said character data is not reduced during operation of said conversion means.

2. An image transmission apparatus comprising: read-out means for reading an image and converting said image into an image signal; encoding means for compression-encoding said image signal; storage means for storing said encoded image data; and transmission means for transmitting said image data in said storage means; whereby said storage means stores an end-of-line code indicating the end of one line of said image data in a predetermined format, and said transmission means transmits, together with said image data, said end-of-line code in a different format from said predetermined format.

3. An image transmission apparatus according to claim 2, wherein said end-of-line code has a code length set longer than a maximum code length of said image data.

4. An image transmission apparatus according to claim 2, wherein said end-of-line code has a code length set longer than a number of bits parallel-processed at said transmission means.

5. A data transmission apparatus comprising:
   means for generating transmission data;
   timer means for generating time data;
   first memory means for storing the transmission data;
   second memory means for storing the time data generated by said timer means, the time data representing a time at which the transmission data is stored in said first memory means;
   transmission means for transmitting the transmission data to a reception side; and
   reproduction means for reproducing the transmission data at a transmission side;
   wherein when said reproduction means reproduces the transmission data, the time data stored by said second memory means is reproduced together with the transmission data, and when said transmission means transmits the transmission data, actual transmission time data generated by said timer means is transmitted together with the transmission data.

6. A data transmission apparatus according to claim 5, wherein said generating means reads an original image and generates an image signal.

7. A data transmission apparatus according to claim 5, wherein a single memory comprises said first and second memory means.

8. An image transmission apparatus comprising:
   means for reading an image and obtaining an image signal;
   converting means for compression-encoding the image signal;
   first memory means for storing an image code encoded by said converting means;
   second memory means for storing a code formation of the image code stored in said first memory means, the code formation being stored in correspondence with the image code;
   transmitting means for transmitting the image code stored in said first memory means;
   receiving means for receiving an identification signal from a reception side, the identification signal representing a code formation which is acceptable by said reception side; and
   supplying means for converting the image code into the code formation represented by the identification signal when the code formation represented by the identification signal is different from the code formation stored in said second memory means.

9. An image transmission apparatus according to claim 8, wherein a single memory comprises said first and second memory means.

10. An image transmission apparatus comprising:
    reading means for reading an original document image in a plurality of different resolutions;
    designating means for designating the reading resolution of said reading means;
    first memory means for storing an image signal read by said reading means;
    second memory means for storing the reading resolution of the image signal stored in said first memory means, the reading resolution being stored in correspondence with the image signal;
    transmitting means for transmitting the image signal stored in said first memory means;
    receiving means for receiving from a reception side an identification signal representing a resolution which is acceptable by said reception side; and
    supplying means for converting the image signal into the resolution represented by the identification signal when the resolution represented by the identification signal is different from the resolution stored in said second memory means.

11. An image transmission apparatus according to claim 10, wherein a single memory comprises said first and second memory means.

12. An image transmission apparatus according to claim 10, further comprising:
    third memory means for storing a size of the original document image, the size of the original document image being stored in correspondence with the image signal;
    wherein said receiving means receives a size signal which represents a size receivable at said reception side, and said supplying means converts the image signal on the basis of the resolution represented by the identification signal, the size represented by the size signal, the resolution stored in said second memory means and the size stored in said third memory means.

13. A data transmission apparatus comprising:
    means for generating transmission data;
    storing means for storing the transmission data, said storing means being rewritable;
    means for sequentially transmitting the data stored in said storing means to a plurality of receiving apparatuses; and deciding means for deciding whether the transmission of the data to all of said plurality of receiving apparatuses is completed, and for clearing the data from said storing means when said deciding means decides that the transmission is completed.

14. A data transmission apparatus according to claim 13, wherein said storage means stores at least one page data.

15. A data transmission apparatus according to claim 13, said data generating means reads an original image and generates an image signal.

16. An image communication apparatus comprising:
readout means for reading an image and converting the image into an image signal;
encoding means for compression-encoding the image signal;
storage means for storing encoded image data;
transmitting means for transmitting the encoded image data;
detecting means for detecting an usused capacity in said storage means; and
changing means for changing a formation of the encoded image data to be transmitted in response to an output from said detecting means.

17. An image transmission apparatus according to claim 16, wherein said storage means stores at least one page image data.

18. An image communication apparatus according to claim 16, wherein said changing means changes an encoding manner of said encoding means.

19. An image communication apparatus according to claim 18, wherein said changing means selects a two-dimensional encoding manner when the unused capacity of said storage means is larger than a predetermined quantity, and a one-dimensional encoding manner when the unused capacity of said storage means is less than the predetermined.

* * * * *

UNITED STATES PATENT AND TRADEMARK OFFICE
CERTIFICATE OF CORRECTION

PATENT NO. : 4,772,955
DATED : September 20, 1988
INVENTOR(S) : SADASUKE KURAHAYASHI, ET AL. Page 1 of 4

It is certified that error appears in the above-identified patent and that said Letters Patent is hereby corrected as shown below:

AT [56] IN REFERENCES CITED

U.S. Patent Documents,
"4,432,020  2/1984  O'Mose et al. ..... 358/257"
should read
--4,432,020  2/1984  Onose et al. .... 358/257 --.

AT [57] IN THE ABSTRACT

Line 1, "includes;" should be deleted.

IN THE DRAWINGS

Sheet 7, Figure 7, "FORTH" should read --FOURTH--.
Sheet 8, Figure 8A, "FORTH BIT 0" should read --FOURTH BIT 0--.
Sheet 9, Figure 8E, "THINED-OUT NUNBER (5)" should read --THINNED-OUT NUMBER (5)--.
Sheet 9, Figure 8E, "MEMOR," should read --MEMORY,--.
Sheet 15, Figure 9C, "STANDBY BODE" should read --STANDBY MODE--.
Sheet 26, Figure 22, "MADE ?" should read --MODE ?--.

COLUMN 5

Line 3, "runlength" should read --run-length--.
Line 55, "a" should read --as--.

COLUMN 6

Line 18, "transmit" should read --transmits--.
Line 61, "even" should read --even if--.
Line 61, "is" should read --are--.

UNITED STATES PATENT AND TRADEMARK OFFICE
CERTIFICATE OF CORRECTION

PATENT NO. : 4,772,955
DATED : September 20, 1988
INVENTOR(S) : SADASUKE KURAHAYASHI, ET AL. Page 2 of 4

It is certified that error appears in the above-identified patent and that said Letters Patent is hereby corrected as shown below:

COLUMN 7

Line 64, "basing" should read --based--.

COLUMN 8

Line 11, "judge" should read --judgement--.

COLUMN 9

Line 18, "afore-mentioned" should read --aforementioned--.
Line 19, "which in" should read --which is in--.
Lines 42-43, "to for example" should read --to, for example,--.
Line 59, "$32X2^6;27X2^6,$" should read --$32X2^6:27X2^6,$--.
Line 60, "B4are" should read --B4 are--.

COLUMN 10

Line 6, "run length" should read --run-length--.

COLUMN 11

Line 28, "offhook" should read --off-hook--.

COLUMN 13

Line 11, "13," should read --13.--.
Line 30, "is for example read" should read --is, for example, read:--.
Line 51, "sub scan" should read --sub-scan--.

UNITED STATES PATENT AND TRADEMARK OFFICE
CERTIFICATE OF CORRECTION

PATENT NO. : 4,772,955
DATED : September 20, 1988
INVENTOR(S) : SADASUKE KURAHAYASHI, ET AL.   Page 3 of 4

It is certified that error appears in the above-identified patent and that said Letters Patent is hereby corrected as shown below:

COLUMN 15

Line 55, "unusable" should read --usable--.

COLUMN 16

Line 3, "RAM 23" should read --MPU 23--.
Line 35, "stores." should read --stored.--.
Line 43, "achieve" should read --achieved--.
Line 48, "that:" should read --that--.

COLUMN 17

Line 2, "mean" should read --means--.

COLUMN 18

Line 44, "a the" should read --at the--.

COLUMN 21

Line 10, "13, said" should read --13, wherein said--.

UNITED STATES PATENT AND TRADEMARK OFFICE
CERTIFICATE OF CORRECTION

PATENT NO. : 4,772,955
DATED : September 20, 1988
INVENTOR(S) : SADASUKE KURAHAYASHI, ET AL.   Page 4 of 4

It is certified that error appears in the above-identified patent and that said Letters Patent is hereby corrected as shown below:

COLUMN 22

Line 1, "usused" should read --unused--.
Line 18, "predetermined." should read --predetermined quantity.--.

Signed and Sealed this

Ninth Day of May, 1989

Attest:

DONALD J. QUIGG

Attesting Officer    Commissioner of Patents and Trademarks